US007394555B2

(12) United States Patent
Cox et al.

(10) Patent No.: US 7,394,555 B2
(45) Date of Patent: Jul. 1, 2008

(54) DIGITAL CONTROL SYSTEM

(75) Inventors: Steven W. Cox, Chesnee, SC (US); Harold Lee Johnson, Pauline, SC (US); George C. Varner, Moore, SC (US); Jerome L. Wood, Lagrange, GA (US)

(73) Assignee: Milliken & Company, Spartanburg, SC (US)

( * ) Notice: Subject to any disclaimer, the term of this patent is extended or adjusted under 35 U.S.C. 154(b) by 739 days.

(21) Appl. No.: 11/047,081

(22) Filed: Jan. 31, 2005

(65) Prior Publication Data

US 2005/0206935 A1 Sep. 22, 2005

(51) Int. Cl.
*G06F 15/00* (2006.01)
*B41J 29/38* (2006.01)

(52) U.S. Cl. .......................... 358/1.12; 358/1.9; 347/5; 347/20; 700/133

(58) Field of Classification Search ................. 358/1.3, 358/1.4, 1.8, 1.9, 1.12, 486; 347/5, 9, 12, 347/20, 57; 700/133
See application file for complete search history.

(56) References Cited

U.S. PATENT DOCUMENTS

| | | | | |
|---|---|---|---|---|
| 3,894,413 | A | 7/1975 | Johnson | 68/205 R |
| 4,033,154 | A | 7/1977 | Johnson | 68/205 R |
| 4,116,626 | A | 9/1978 | Varner | 8/149 |
| 4,170,883 | A | 10/1979 | Varner | 68/205 R |
| 4,545,086 | A | 10/1985 | Varner | 8/151 |
| 4,614,300 | A | 9/1986 | Falcoff | 239/71 |
| 4,984,169 | A | 1/1991 | Johnson, Jr. | 364/469 |
| 5,195,043 | A * | 3/1993 | Varner | 700/133 |
| 5,398,121 | A * | 3/1995 | Kowalewski et al. | 358/504 |
| 6,704,610 | B2 | 3/2004 | West et al. | 700/133 |
| 6,792,329 | B2 | 9/2004 | Adams, Jr. et al. | 700/133 |
| 6,902,253 | B2 * | 6/2005 | Gonzalez | 347/57 |
| 6,907,634 | B2 | 6/2005 | Kobayashi et al. | 8/148 |
| 7,034,960 | B2 * | 4/2006 | Stone et al. | 358/1.9 |
| 7,046,396 | B2 * | 5/2006 | Chan | 358/1.9 |
| 7,202,976 | B2 * | 4/2007 | Stone et al. | 358/1.9 |
| 7,268,918 | B2 * | 9/2007 | Postle et al. | 358/1.9 |
| 7,277,202 | B2 * | 10/2007 | Chan | 358/1.9 |
| 2003/0052931 | A1 * | 3/2003 | Hadimioglu et al. | 347/12 |
| 2003/0139840 | A1 * | 7/2003 | Magee et al. | 700/133 |

* cited by examiner

*Primary Examiner*—Kimberly A Williams
(74) *Attorney, Agent, or Firm*—Terry T. Moyer; Daniel R. Alexander

(57) ABSTRACT

Disclosed herein is an electronic digital control system for printing a pattern onto the surface of a moving substrate in accordance with digitally-defined pattern data using a plurality of individually controllable colorant-dispensing applicators arranged in a series of arrays positioned along the path of said moving substrate, with each array containing a colorant representing a separate process color. The digital control system converts the pattern data, expressed in terms of a color assignment for each individual pattern element comprising the desired pattern, into a series of logical firing instructions for each applicator as required to reproduce the assigned color on the substrate using one or more process colors.

13 Claims, 16 Drawing Sheets

*FIG. –1–*

STAGGER MEMORY

G-RAM FOR SINGLE COLOR BAR HAVING 960 APPLICATORS

LUT / CONTROL PORT

DATA PORT

EMBEDDED CONTROL

ELECTRONIC REGISTRATION

DIGITAL CONTROL SYSTEM

This relates to a process and apparatus directed to the control of a computer-controlled dye injection technique in which multi-colored patterns may be reproduced on a moving absorbent substrate by the assignment and application, in accordance with pre-determined pattern data defined in terms of pattern pixels, of a plurality of liquid colorants, each applied from a separate, independently controlled applicator. More specifically, this disclosure is directed to a control system by which pattern-derived colorant applicator actuation instructions may be generated and directed to the appropriate individual applicators to generate the desired pixel-defined pattern on the substrate, as the substrate is moving past the applicators at a relatively high speed. This control system is capable of automatically accommodating changes in the speed of substrate movement with no adverse effects on pattern definition, or excessive or inadequate colorant delivery.

The techniques described herein are applicable to the patterning of a variety of substrates, and are particularly suited to the pattering of absorbent substrates such as textile substrates. While such techniques may be readily adaptable for use in conjunction with a variety of printing systems, they are particularly well suited to pixel-based systems in which the dyed image is formed by the precise delivery of an individually specified aliquot of a liquid dye (also referred to herein as a colorant) to a predetermined location on the surface of a textile substrate by means of individually-addressable colorant applicators under computer control. The specific application used for discussion purposes is that of patterning floor covering materials, such as carpet tiles, broadloom carpet, rugs, mats, and the like, although the control system is capable of use with patterns intended for interior furnishing applications (e.g., upholstery, draperies, automotive interiors, etc.), or other applications.

Imaging or printing systems that use the concept of pixels to place images on substrates are in common use in the printing and textile industries, and have been the subject of numerous research and development efforts. Such systems form patterns through the application of measured quantities of colorant to specified areas on the substrate dictated by the pattern to be reproduced. In pixel-based systems (as that term is used herein), the smallest area on the substrate to which a specific color may be assigned is a pixel. Each unique color used in one or more pixels within a pattern is referred to as a pattern element. Thus, a two-color image of a chess board may be thought of as a pattern having many (at least 64) pixels and 2 pattern elements. The control system described herein is capable of directing the application of different colorants to precisely defined pixel-sized areas on the surface of a moving substrate, thereby forming a multi-colored pattern on the substrate from an electronically-defined pattern comprised of a plurality of pattern elements.

Various aspects of techniques for patterning textile substrates in which the individual applicators are under computer control are described, for example, in commonly-assigned U.S. Pat. Nos. 3,942,342; 3,969,779; 4,033,154; 4,116,626; 4,170,883; 4,545,086; 4,894,169; 4,984,169; 5,128,876; 5,136,520, 5,140,686; 5,142,481; 5,195,043; 5,208,592; 5,408,380; and 5,425,389, all of which are hereby incorporated by reference herein.

Machines embodying the various patterning devices and techniques described in the above-listed patent documents are particularly well-adapted for patterning textile substrates. In one preferred embodiment, the application of such colorants to specific pixels is achieved through the use of sets of hundreds of individual dye applicators, respectively mounted along the length of a plurality of individual color bars that are positioned in spaced, parallel relation so as to span the path of the moving substrate to be patterned (i.e., the arrays are positioned generally perpendicular to the path of the substrate, which moves along the path and opposite such arrays). The various individual applicators associated with a given color bar therefore collectively have access to all areas of the substrate to which colorant is to be applied. In this preferred embodiment, each applicator in a given color bar is supplied with liquid colorant from the same colorant reservoir (the inherent color of which is referred to as a "process color"), with different arrays being supplied from different reservoirs, typically containing different colorants. Colors required by the pattern that are not process colors may be reproduced using any of several traditional techniques such as half-tone, or, possibly more appropriate in textile printing with particularly absorbent substrates, by the in situ blending of two or more process colorants that are dispensed in a desired proportion on the substrate surface.

By generating applicator actuation instructions ("firing times") that accommodate (1) the specific colorant to be dispensed, (2) the position of the appropriate color bar for that colorant relative to the position of other color bars, (3) the position of that color bar relative to the position of the target pixel on the moving substrate, (4) the position of the specific applicator within the length of the color bar, and (5) the quantity of colorant to be dispensed by that specific applicator, any available colorant may be applied to any pixel in (theoretically) any pre-defined quantity within the pattern area on the substrate, as may be required by the specific pattern being reproduced. The control system disclosed herein provides for appropriate actuation instructions for each such applicator, thereby providing the capability of delivering differing, carefully metered quantities of colorant to different pixels, depending upon the requirements of the pattern to be reproduced as the pixels pass under each respective array, in accordance with the desired electronically-defined pattern.

It has been found that, so long as (1) the number of groups or arrays and the total number of individual applicators remains somewhat limited, (2) the relative motion of the applicators with respect to the moving substrate remains relatively slow, and (3) the colorant application requirements of the pattern with respect to color variety, colorant penetration, and pattern detail remain undemanding, existing control systems such as those described in the U.S. patents set forth above are satisfactory. However, where commercial demands require the high speed production of multi-colored patterned products carrying high definition images, it has been found that existing control systems are often not capable of generating the actuation instructions, providing the appropriate compensations to those instructions, and routing the instructions to the appropriate individual colorant applicator in the time frame demanded by the desired production rate. This is particularly true in situations, for example, requiring high definition patterning using a large number of applicators per color (e.g., hundreds), a large number (e.g., dozens) of different groups or arrays corresponding to available process colors, or a complex pattern in which in situ color blending is required (e.g., generating, by controlled blending, colors on the substrate different from the colors applied to the substrate).

In the system described herein, computer software and hardware are used to route electronic patterning instructions to each applicator within each group or array in a manner that allows for the rapid and efficient distribution of pattern data to all arrays, with appropriate consideration and compensation provided for the different colors needed, the relative position of each applicator with respect to other applicators, the relative position and motion of the applicators to the moving substrate, and the speed by which the patterning instructions must be generated and delivered to the actuators, as well as other considerations.

The following is a discussion of a representative embodiment of this system. Specifically, this embodiment is an exemplary textile patterning device, employing eight color bars and capable of patterning both discrete substrate units (e.g., carpet tiles, rugs, or mats) as well as a substrate in the form of a continuous web (e.g., broadloom carpet, or rugs or mats that are patterned in web form and subsequently cut into discrete rug or mat form). Operationally transparent accommodation of these different substrate formats, necessary to preserve the versatility of the patterning system, is considered a strength of this control system, but presents a host of data requirements to allow the system, for example, to track the leading and trailing edge of each discrete unit (e.g., the leading and trailing edge of the carpet tile) and the seam between joined web sections, and adjust the patterning instructions accordingly (e.g., suspend patterning). Because of the exemplary nature of this embodiment, unless otherwise noted, the numerical values used are for discussion purposes only; other values may be useful or preferred, depending upon factors such as machine setup, specific patterning requirements, choice of substrates and colorants, etc.

DEFINITIONS

To assist in this discussion of the operation and utility of this embodiment, the following terms are used. The terms shall have the indicated meanings, unless the context otherwise dictates.

The term "color bar" or "array" shall refer to the linear arrangement of dye or colorant applicators that are positioned, preferably perpendicularly, across the path of the moving substrate to be patterned, all of which are being supplied the same colorant. The number of color bars used is equal to the maximum number of different colorants that may be applied to the substrate. The number of colorant applicators on each bar is equal to the maximum number of pixels that can be reproduced in the pattern in the direction along the length of the color bar (which direction, because the bar spans the substrate path through the patterning device, may also be referred to as along the width of the patterning device, referring to the width of the substrate being patterned). Although color bars contain valve cards that carry a diagonally staggered set of applicators, the overall functionality of a color bar is equivalent to a single line of individual, side-by-side applicators, extending across the path of the substrate.

The term "jet" is synonymous with colorant applicator, and generally will refer to the individual applicators or dispensers of colorant arranged along the color bars, and particularly to the orifice associated with each applicator.

The term "firing time" shall refer to the elapsed time in which an applicator (or set of applicators) is dispensing dye or colorant. In the example herein, firing time is specified in units of 0.1 or 0.2 milliseconds.

The term "base firing time" is a single firing time, associated with a specific substrate or carpet base, that equates to the maximum quantity of dye or colorant that can be dispensed on that substrate without causing flooding or other undesirable aesthetic effects. It represents the maximum practical firing time to be used with that substrate if such undesirable effects are to be avoided.

The term "pixel" or "pixel area" shall be used somewhat loosely to describe the smallest area on the substrate onto which a controlled amount of colorant can be assigned. The pixel also serves to describe that small, indivisible unit that forms the basis on which the pattern is defined. By implication, because of the one-to-one relationship between colorant applicators and pixels (at least along the length of the color bar), the pixel also forms the basis for the construction of the streams of pattern data and applicator instructions that are associated with the pattern. Accordingly, the pixel represents the building block from which all patterns are constructed, both conceptually and physically. The term "pixel" is distinguishable from the term "pattern element."

The term "pattern element" shall refer to a single assignable color used to form a pattern. The number of pattern elements associated with a given pattern is equal to the number of visually distinct, assignable colors contained in that pattern.

The term "pattern line" shall refer to 1-pixel-wide strips of pattern extending across the width of the substrate (i.e., in the direction perpendicular to the direction of substrate movement, and parallel to the color bars to which the arrays of colorant applicators are affixed) applied by each of the applicator arrays as the substrate is indexed forward through the patterning device.

The term "machine direction" shall refer to the direction of movement of the substrate transport as it passes opposite the colorant applicators on its way through the patterning device. It is presumed that the substrate to be patterned is either in the form of a continuous web, e.g., a broadloom floor covering (in which case the machine direction is the direction in which the web is moving) or is in the form of a series of discrete substrate units, e.g., individual carpet tiles or area rugs, in which case the machine direction follows the path leading into and through the patterning device of choice. Where the applicators are maintained in a fixed position (e.g., on non-moving color bars), the machine direction corresponds to the direction of motion of the substrate through the patterning device.

The term "machine cycle" is used to refer to the cyclical nature of the activities that occur within the pattern device or its control system each time a new pattern line is formed on the substrate.

The term "colorant" shall mean a readily flowable ink, dye, or other liquid coloring agent dispensed or to be dispensed onto the substrate, but is also intended to include any other material (e.g., a diluent, an etching agent, etc.) that may have no intrinsic color of its own.

The term "process color" and its derivative terms (e.g., process colorant) shall refer to the intrinsic color of the colorant that is supplied to and dispensed by the applicators on a given color bar, or to the colorant itself. In the patterning device disclosed herein, the number of color bars sets the upper limit on the number of process colors available for patterning (or for in situ blending).

The term "in situ blend" and its derivative terms shall refer to the separate application of two or more process colorants to the same or adjacent pixels on a substrate, with at least some mixing or blending of the colorants taking place following such application. Frequently, the term is used to describe the intentional mixing of two or more different process colors on the substrate surface to yield a color different from any of the available process colors.

The term "textile substrate" shall be used to describe any of a wide variety of fabrics or floor covering materials comprised of textile fibers that have been integrated into a planar structure in which the individual fibers have been woven, knitted, or otherwise inter-entangled (as, for example, in a non-woven fabric), or have been integrated or attached to a separate backing material or other substrate, as by, for example, tufting, bonding, flocking, needlepunching, etc. Specifically included as non-limiting examples are carpets, carpet tiles, broadloom rugs, area rugs, and mats, any of which may be variously comprised of polyamide or other synthetic fibers, wool, cotton or other natural fibers, or combinations thereof.

The term “pattern” and its derivative terms shall mean assigning or imparting one or more pre-defined colors to a substrate surface, and shall refer both to the assignment of colors to specific pixels within the pattern and to the dispensing of liquid colorants in corresponding areas on the substrate surface (which areas, for convenience, shall also be referred to as pixel areas or pixels). While a pattern typically involves different colors, arranged in pre-determined configurations, placed in various areas of the substrate surface, it may also refer to the assignment or generation of a single color in all areas of the substrate surface, i.e., a “solid color” pattern. In either case, the color(s) may be generated on the substrate surface through the pixel-by-pixel application of a single liquid colorant (e.g., if the desired color assigned to that pixel can be reproduced using a single process color), or the application of several different liquid colorants to the same pixel to form an in situ blend having the desired color on the substrate surface.

The term “seam” is used to describe the line along which two floor covering webs are joined (e.g., sewn).

The terms “upstream” and “downstream” are used to describe relative positions in relation to the movement of the conveyor that is transporting the substrate to be patterned. For example, an upstream array is positioned earlier along the path of the substrate than a downstream array, and the substrate will encounter the “upstream array” earlier in time than the “downstream array.”

BRIEF DESCRIPTION OF THE FIGURES

To assist further in the explanation of the operation and utility of this development in the embodiment described below, the following Figures are used, the general contents of which are summarized below.

FIG. 5A corrects for color bar spacing; FIG. 5B corrects for valve card applicator offset.

OVERVIEW OF SYSTEM

To better understand the overall approach taken in the design and implementation of the control system described herein, the following description has been loosely organized into several sections, the first of which provides an overview of the major functional elements into which the control system is divided. As part of that detailed description, the workings of several major functional elements introduced in the overview will be discussed. Following that description is a detailed description of the functionality associated with the LUT/Control and Data ports that contribute to the overall functionality of the control system.

Figure 1:
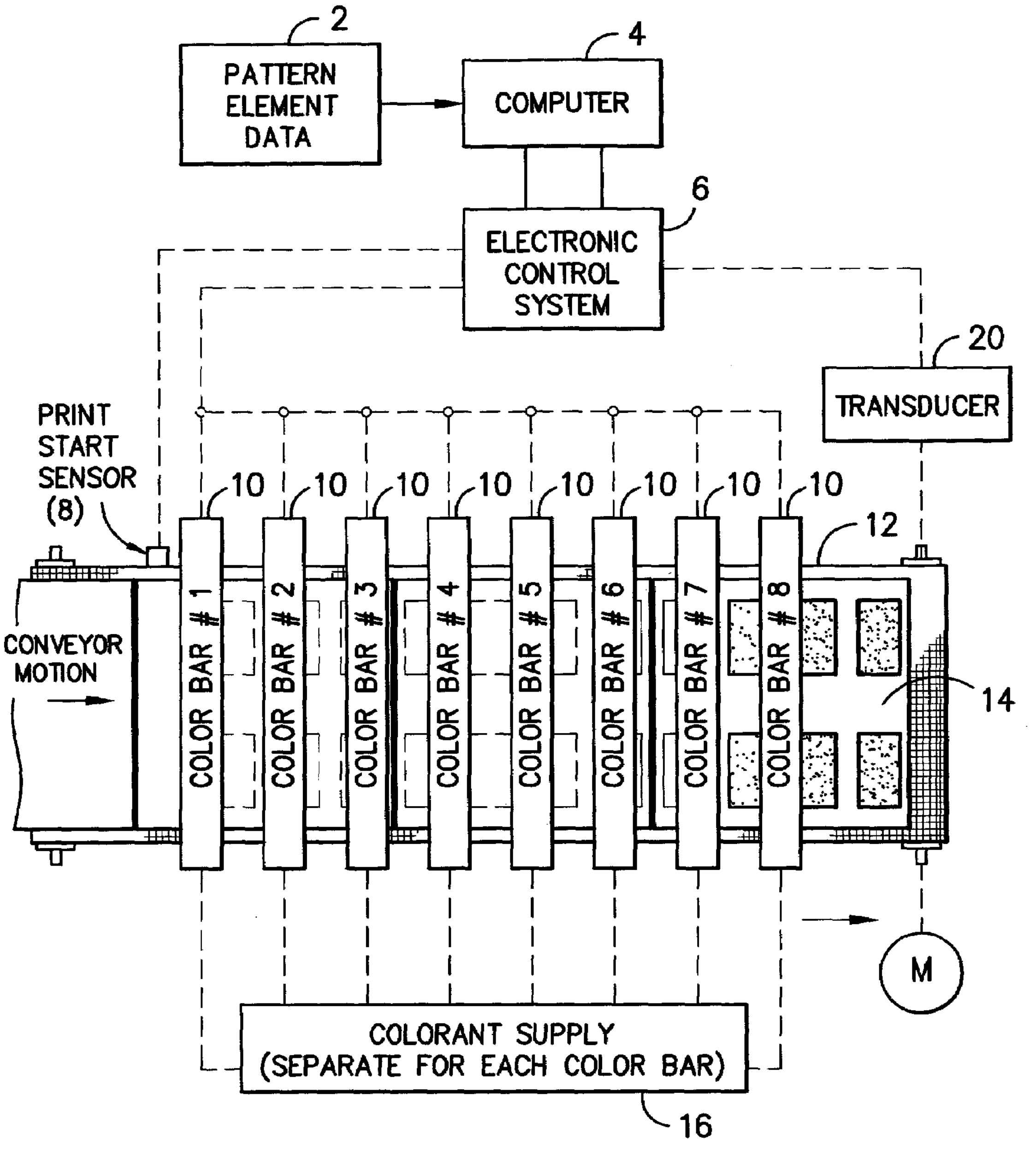
FIG. 1 is a diagrammatic plan view of a metered jet dyeing device to which the control described herein is particularly well adapted, showing eight color bars (each containing a plurality of valve cards, as shown in FIG. 2).
Figure 2:
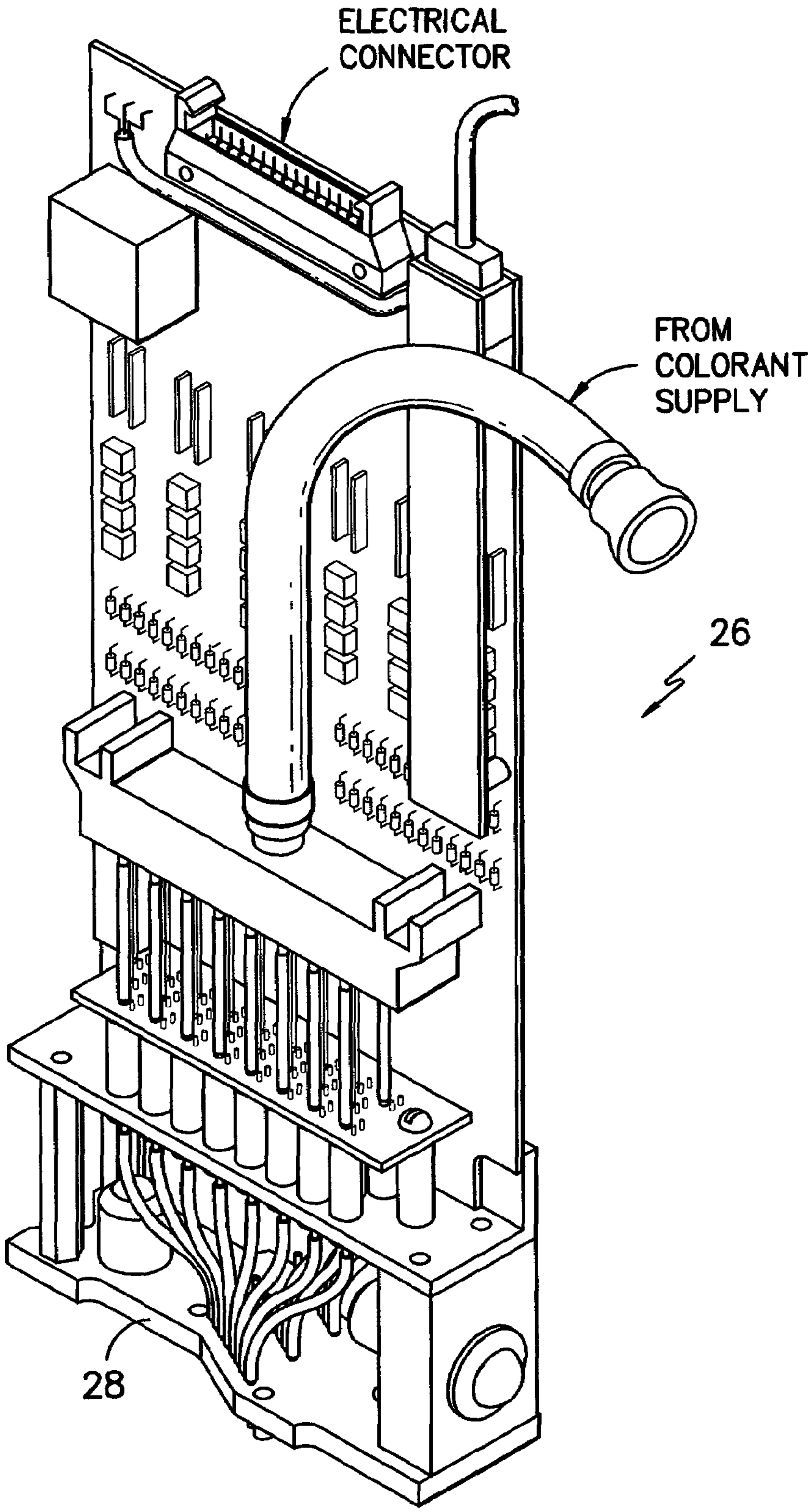
FIG. 2 is a perspective view of a single group of applicators and associated valves, as arranged on a single modular valve card. A color bar contains a plurality of such modular valve cards, arranged in parallel fashion in the direction of substrate travel and spaced along the length of the color bar.
Figure 3:
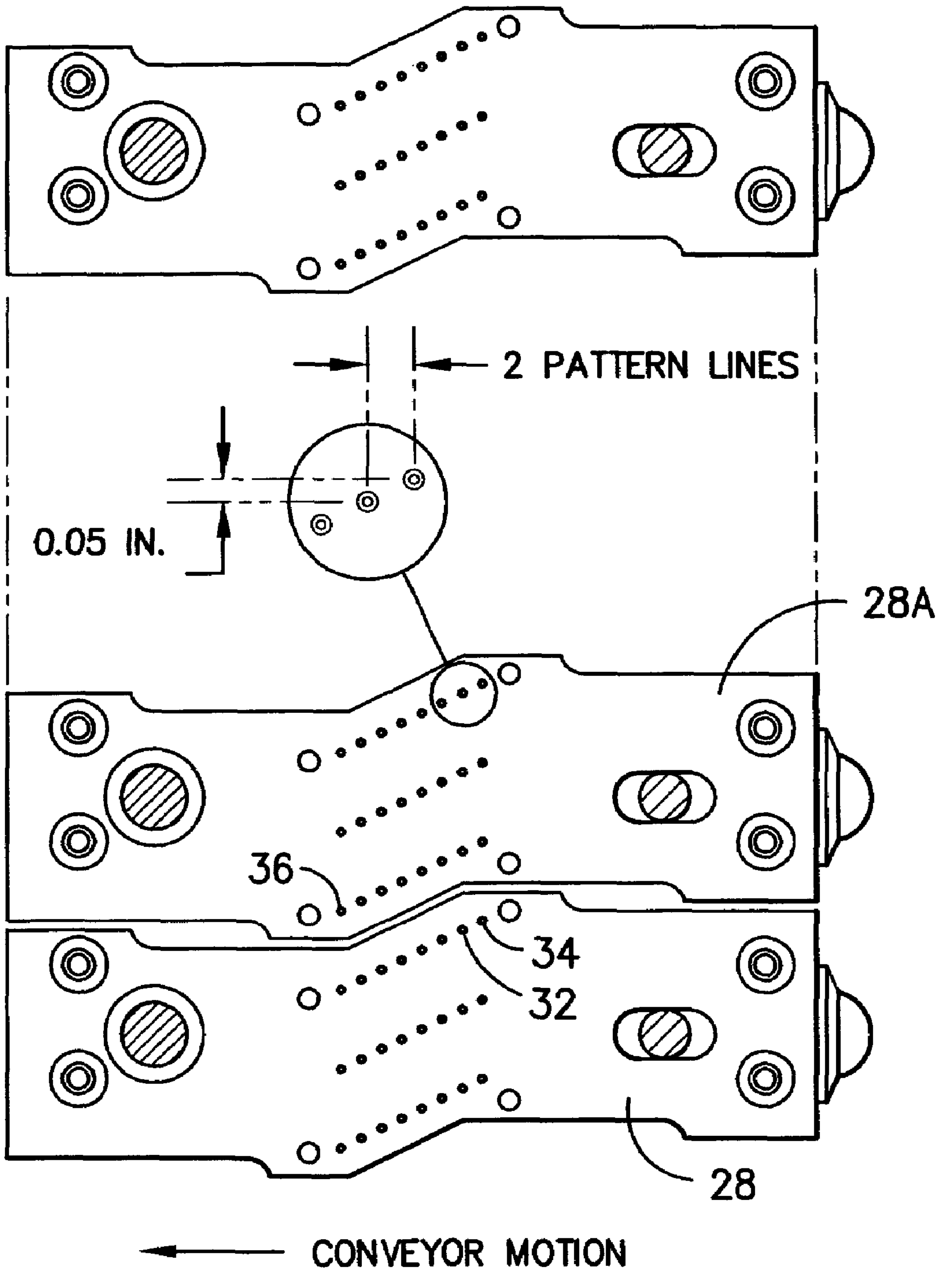
FIG. 3 is a view of several of the valve cards of FIG. 2, as seen from the orifice side (i.e., looking up from the surface of the substrate to be patterned), showing the parallel diagonal arrangement of the applicator orifices in an offset or staggered configuration to allow for closer spacing of the orifices in the direction of substrate motion (indicated by an arrow), and showing the side-by-side arrangement of the valve cards within the color bar.

By way of initial orientation to the physical processes referred to herein, FIGS. 1 through 3 depict one example of a textile patterning device to which the control system described herein is particularly suited. As shown in FIG. 1, the exemplary patterning device, chosen for discussion purposes only, is comprised of a spaced series of color bars 10 that extend across a conveyor 12. The substrate(s) to be patterned 14 are transported under each of the color bars, to allow the array of applicators mounted on the color bar to dispense a precisely metered quantity of colorant. Each color bar is supplied from a separate, color-bar-specific supply source 16, allowing each bar to dispense a different color, with all applicators on a given bar dispensing the same color (shown for convenience in FIG. 1 as a single supply). Also indicated are Pattern Element Data source 2, Computer 4, Electronic Control System 6, Print Start Sensor 8, and Transducer 20, all of which will be discussed in further detail below.

Conveyor 14 is adapted to move the substrate(s) to be patterned in continuous fashion at a relatively high speed (i.e., up to tens of yards or meters per minute). Conveyor motion is carefully monitored by a rotary encoder 20 or similar device, which, in the example discussed herein, generates a pulse (referred to herein as a “high resolution” pulse) each time the substrate moves $1/240^{th}$ of an inch (“fine scale movement”). Distance increments significantly larger or somewhat smaller are expected to be advantageous or preferable under some conditions. The resulting stream of encoder pulses not only allows for the calculation of conveyor speed (when combined with an appropriate time base), but, importantly, allows the control system to determine the precise location of the substrate(s) on the conveyor. This allows the control system to be based on substrate position, rather than speed or time, and provides, via the individual pulses, a convenient, time-independent basis on which to define a machine cycle, during which all data manipulation and distribution activities, as well as all other control system functions, may be performed and/or refreshed.

As will be discussed herein, some functions of the control system depend upon high resolution pulses, while others use the passage of a set number of high resolution pulses (e.g., every twelfth high resolution pulse) to define "low resolution pulses," on which certain control system cycles or events are initiated.

The other measurement used herein in connection with the operation of the control system is based upon the thickness (i.e., measured in the direction of conveyor motion) of a single pattern line, and is sometimes referred to as "low resolution" in the following discussion. In the example most often cited herein, a print gauge of 20 is assumed, meaning that the patterning device will produce 20 pixels per linear inch across the width of the patterning machine as well as along the direction of conveyor motion. Therefore, a pattern line is assumed to have a thickness of 0.05 inches. Also indicated are Pattern Element Data source 2, Computer 4, Electronic Control System 6, and start print sensor 8.

As shown in FIG. 2, the applicators on a given color bar are conveniently grouped on valve cards 26, which allow all the electronic and electromechanical components to be arranged in a sturdy, modularized unit to facilitate easy installation and uniform alignment of the on-board applicators on the color bars. The offset arrangement of the applicator orifices on the base 28 of the valve card of FIG. 2, shown in detail in FIG. 3, allows for unusually close side-by-side (i.e., lateral, rather than diagonal) spacing of the applicator orifices as seen from the machine direction, thereby allowing colorant applications at closely-spaced intervals—for example, intervals in which the lateral distance between adjacent applicator orifices is 0.02 inch or less, depending upon the level of applied pattern resolution desired. Distance between adjacent applicator orifices in the machine direction (i.e., parallel to substrate motion) in this example is 0.1 inch, or two pattern lines if 20 gauge patterning (i.e., 20 pixels/inch) is undertaken. In the example discussed below, a lateral distance of 0.05 inch was selected as a convenient value, and is shown in the Figures.

If uniform resolution of the applied pattern is desired (i.e., equal average density of dispensed colorant in orthogonal directions on the substrate), the lateral distance value selected may be equal to the incremental step selected for conveyor movement, but this is by no means a requirement (as is clear from the numerical examples used herein). Note that a preferred arrangement of individual valve cards on a color bar results in the lateral distance between the last applicator orifice on a given card and the first applicator orifice on an adjacent card being equal to the lateral distance between any two adjacent applicator orifices on either of the cards. This is shown in FIG. 3 in the positioning of bases 28 and 28A, and the lateral positioning of applicator orifices 34 and 36 with respect to the direction of conveyor motion. This prevents any non-uniformity (e.g., gaps, overlaps, etc.) in applicator orifice lateral spacing as one moves from within a given valve card (e.g., spacing between applicator orifices 32 and 34) to an adjacent valve card (e.g., beginning with applicator orifice 36).

While the advantages of having diagonally-offset applicator orifices are several, such an arrangement requires compensation for the fact that the applicator orifices are not physically aligned along the length of the color bar. This puts an additional requirement on the control system described herein, in that it must not only compensate for the fact that different colors must be applied to the substrate at different times as a consequence of the spaced relationship among different color bars and the time necessary for the substrate to move under each (referred to as "color bar stagger"), but must also compensate for the smaller scale, but equally important, spaced relationship among applicator orifices within a single color bar (referred to as "valve card stagger").

Having reviewed one example of hardware appropriate for use with the control system described herein, attention will now shift to the control system itself, and to the generation, function, and flow of various signals and data within that control system and its components.

Figure 4A:
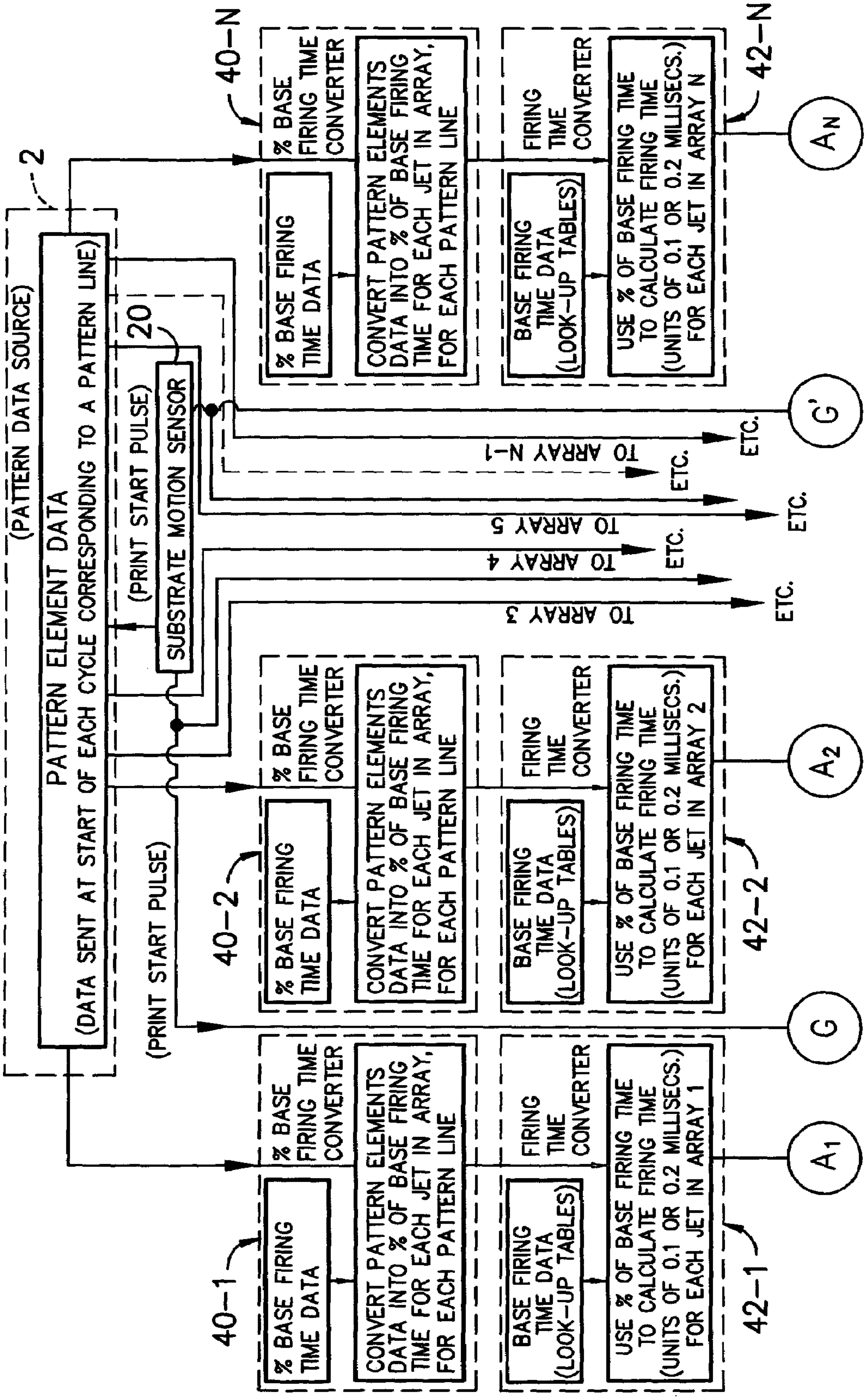
FIGS. 4A and 4B collectively comprise a block diagram depicting the overall conceptual flow of pattern data through the control system disclosed herein.

Looking at FIG. 4A, block 2 represents pattern data that describes the pattern to be reproduced. These data uniquely identify each different color necessary to generate the desired pattern (i.e., every pattern element is represented by a unique binary value, typically expressed in the form of a 12 bit word). The conversion of pattern element data to actual colorant applicator on/off instructions is performed in several steps. At Step 40-1 (signifying Step 40 for color bar 1; Steps 40-2, etc. are identical), the pattern data are used to form an address in a color-bar-specific look-up table ("LUT") that contains, for each pattern element used in the pattern, the "recipe" for how much of the process colorant assigned to that color bar is to be used in creating the desired color, for each pixel in each pattern line. These LUTs are used to associate all pattern elements in the specific pattern with a set of colorant applicator actuation duration times (which, given a constant process colorant flow rate, is equivalent to dispensed colorant volume), expressed as a percentage of base firing time, explained below.

The actuation duration times, which are independent of conveyor speed, can vary from a minimum actuation time of zero (i.e., colorant not needed) to a "relative" maximum actuation time equal to the longest actuation time for that colorant applicator necessary to fully saturate, but not oversaturate, the specific substrate being patterned. This value is a characteristic of the substrate and is an input value specified at the start of the patterning process. As a convenience, these actuation durations are referred to hereinbelow as "firing times" and are expressed in terms of a percentage of this maximum actuation time, which shall be referred to as the "base" firing time. Accordingly, in a preferred embodiment, a firing time of 50% in an LUT indicates the colorant applicator begins dispensing colorant as soon as the substrate is positioned opposite the applicator, and continues to dispense colorant at its predetermined rate for exactly half the time designated as the base firing time for that substrate. Conceptually, the output represents a series of percentages, one for each applicator in the color bar, for each line of the pattern.

The next step shown in FIG. 4A, 42-1, uses the specific base firing time to be used with the substrate being patterned together with the percentages from Step 40-1 to calculate the duration that each applicator in that color bar should be dispensing colorant (referred to hereinafter as "firing time" or "jet firing time"). Conceptually, the output represents a series of individual firing times (arranged in applicator-by-applicator, pattern line-by-pattern line order), measured in standard units of time (e.g., either 0.1 milliseconds or 0.2 milliseconds). Thus, if a given pixel in the pattern called for a quantity of colorant from this color bar requiring flow from the appropriate applicator for 20 milliseconds, the output from Step 42-1 for that applicator and that specific pixel would be either 200 or 100, depending upon the millisecond units selected.

Figure 4B:
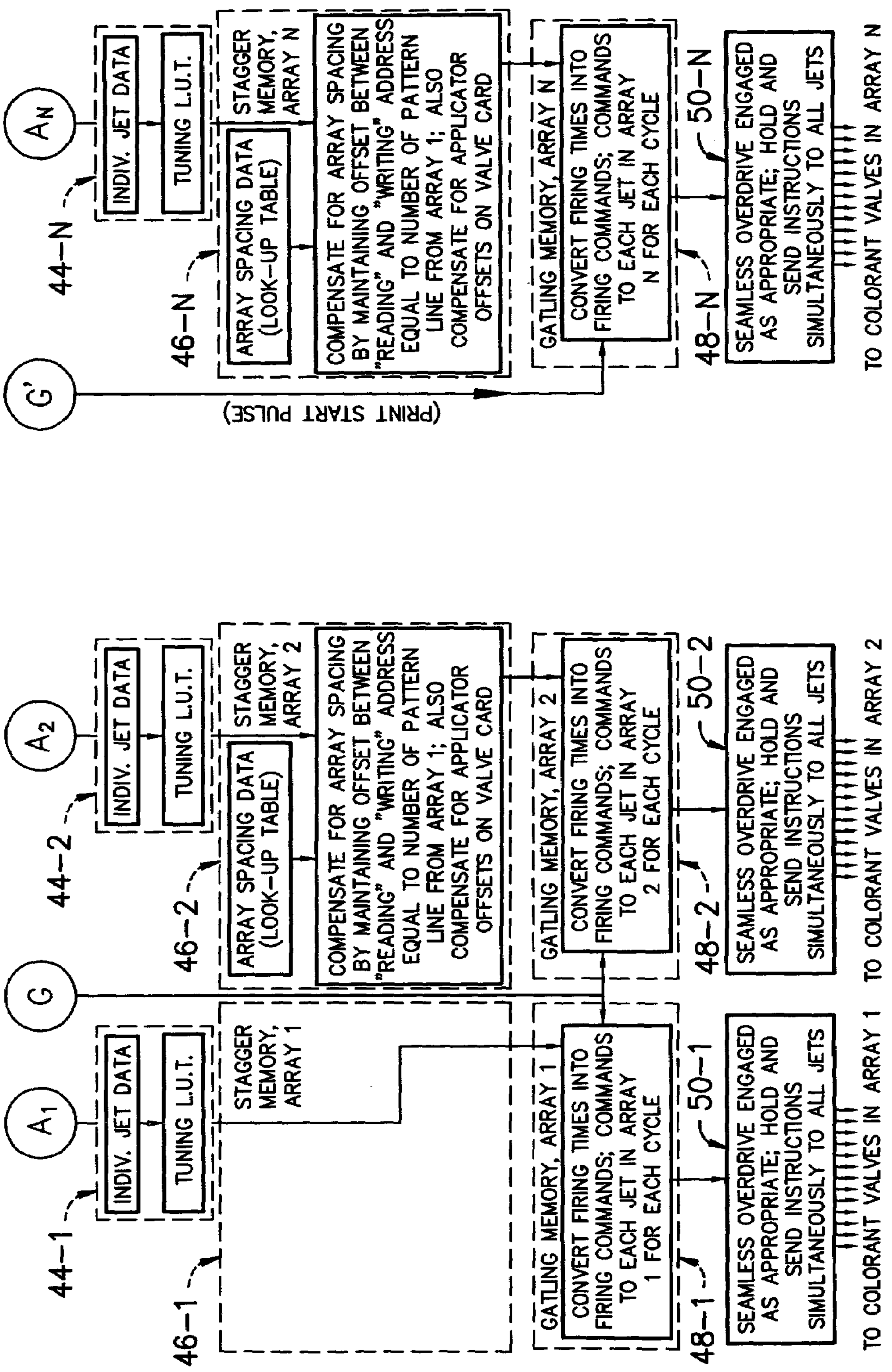

Turning now to FIG. 4B, Step 44-1 indicates an optional memory containing an LUT, into which individual jet firing characteristics have been written. This memory, which may take the form of a static RAM, functions in a "tuning" or "trimming" capacity to compensate, in precise fashion, for small variations in the dye flow characteristics of the individual applicators. This is achieved by means of a look-up table embodied in the RAM which associates, for each applicator in a given array, and, if desired, for each possible firing time associated with each such applicator (thereby storing, in effect, a performance curve for each applicator), an individual factor for each jet that increases or decreases the firing time dictated by the pattern data by an amount necessary to cause all applicators in a given array to deliver substantially the same quantity of dye onto the substrate in response to the same pattern data firing instructions.

The next step depicted in FIG. 4B, Step 46-1, is referred to as the "stagger memory," which serves to provide compensation for the distance separating the first color bar encountered by the substrate and each subsequent "downstream" color bars (i.e., those dispensing colorant after the substrate has passed the first color bar), as well as compensation for the "stagger" or diagonal offset of the individual applicator orifices within a given color bar. This task is accomplished through use of color bar-specific, two-port (e.g., dual port) random access memories ("RAMs"), preferably having sufficient capacity to hold firing time information for each applicator and for each line comprising the pattern. All pattern data for a specific array is loaded into a RAM individually associated with that array. The pattern data at this point are in the form of a series of bytes, each byte specifying a desired firing time (measured in units based on milliseconds) for a single applicator or jet comprising the array.

To preserve the identity of the individual firing times, the loading process is a coordinated one, with all jet firing time data being loaded into the respective RAMs at the same time and in the same relative order, i.e., all firing times corresponding to the first line of the pattern for all jets in each array is loaded in the appropriate RAM first, followed by all data corresponding to the second pattern line, etc. Each RAM is read using reading address offsets which effectively delay the reading of the data a sufficient amount of time to allow a specific area of the substrate to "catch up" to the corresponding pattern data for that specific area which will be sent to the next array along the substrate path. As explained in more detail below, the RAMs are written to and read from in a unidirectional repeating cycle. The respective read and write pointers are separated by an amount that provides the necessary sequencing of firing instructions among the variously positioned applicators both within a single color bar and over several spaced color bars.

Details of Stagger Memory

FIG. 5 is a diagrammatic representation of the "stagger" memory in operation. The "stagger" memory operates on the firing time data produced by the look-up tables and performs two principal functions: (1) the serial data stream from the look-up table, representing firing times, is grouped and allocated to the appropriate arrays on the patterning machine and (2) "non-operative" data is added to the respective pattern data for each array to inhibit, at start-up and for a pre-determined interval which is specific to that particular array, the reading of the pattern data in order to compensate for the distance between adjacent arrays (measured in machine cycles or encoder pulses). Conceptually, this may be thought of as the travel time during which the specific portion of the substrate to be patterned with that pattern data is moving from array to array.

The "stagger" memory operates as follows. The firing time data is sent to an individual random access memory (RAM), preferably of the static, dual-port type, associated with each of the eight arrays. At each array, the data is written to the RAM in the order in which it was sent from the look-up table, thereby preserving the jet and array identity of the individual firing times. Each RAM preferably has sufficient capacity to hold firing time information for the total number of pattern lines extending from the first to the eighth array (assumed to be seven hundred for purposes of this discussion) for each jet in its respective array. In the discussion which follows, it may be helpful to consider the seven hundred pattern lines as being arranged in seven groups of one hundred pattern lines each (to correspond with the assumed inter-array spacing).

FIG. 5 is a pictorial view of the stagger memory. When the computer issues a Master Reset (as would occur at the start of a patterning session), the hardware clears the stagger memory and zeroes the write and read line counters for each color. As the computer begins to output pattern data (in pattern line order), the stagger memories accept a pre-defined number of lines of that data as a pre-load. In this example, that number is 16. This pre-loaded value is necessary to assure that the writing of data into the stagger memory always stays ahead of reading data from the stagger memory (therefore, other values different from 16 may be used). The read counters are at zero, but the write counters are decremented to account for the pre-load, i.e., from 0 to −16 (which is a positive number 16 less than the maximum value of the address counter). The control logic associated with each color bar now waits for its respective print start signal, which is sent to the first color bar by the print start sensor 8 when the first tile approaches the first color bar. Print start signals for the second and subsequent color bars are supplied by the immediately preceding color bar (e.g., print start signal for color bar 2 is supplied by color bar 1, etc.) Each of these subsequent print start signals are delayed based upon the number of encoder pulses that separate the respective color bars.

This delay is decremented by high resolution transducer pulses that come from the incremental encoder on the transport. When the delay reaches 0, the control logic associated with the first color bar sends a print start signal to the second color bar, and begins to read the first line of pattern data, byte-by-byte, from the stagger memory and transfers it to the G-RAM. The read line counter is then decremented. Note that the pattern data, as transferred, has been sequenced to compensate for the diagonal offsets of the individual applicators mounted on the valve cards. This is accomplished by adding a value equal to ((Jet # Mod 8)*2) to the line counter value. At the same time the byte-by-byte pattern data is being transferred, another input cycle from the computer is initiated. This means that the control logic accepts the data for pattern line number 17 (i.e., 16+1) from the computer and stores it in stagger memory for all color bars. The hardware continually stays 16 pattern lines ahead of the first color bar to assure that the pattern data that is read is for the current pattern line. If it did not stay ahead, the hardware would read from an area in the stagger memory that had not been written to, or that had inappropriate data.

The delay logic for the second color bar works identically to that of the first color bar—it effectively waits for the correct number of machine cycles before outputting pattern data. That correct number corresponds to the number of machine cycles needed for the substrate to travel the physical distance between the first color bar and the second color bar. As soon as the pattern line data for the second color bar begins to be read from the stagger memory, a print start signal is sent to the third color bar, and the read and write counters reflect a difference equal to the number of pattern lines between the first and second color bars, plus 16 lines (the pre-loading value initially introduced to the first color bar). In the example in the Figure, the distance between color bar 1 and color bar 2 is 100 pattern lines. When color bar 2 begins printing, color bar 2's write counter is 116. The process for the remaining color bars is essentially identical. Note that color bar 1 initiates the input cycle from the computer to the stagger memory for all color bars, and is the source of the print start signal for color bar 2 (which, in turn, is the source of the print start signal for color bar 3, etc.).

The right hand side of FIG. 5 depicts the stagger memory for the eighth array. As with all other arrays, the "read" pointer has been initialized to the first memory address in the RAM. The "write" pointer, shown at its memory address location when the leading edge of the substrate reaches color bar 8, leads the "read" pointer by an address difference equivalent to 716 pattern lines (assuming seven intervening arrays and a uniform inter-array spacing of one hundred pattern lines).

The storage registers associated with each array's stagger memory store the firing time data for the pattern line to be dyed by that respective array in that pattern cycle until prompted by a pulse from the substrate transducer indicating the substrate has traveled a distance equal to the width of one pattern line. At that time, the firing time data is sent to the "gatling" memory for processing as indicated below, and firing time data for the next pattern line is forwarded to the stagger memory for processing as described above.

The output of this step is in the same form as the previous step, except that the individual firing times for a given color bar have been effectively delayed to allow for the movement of the substrate. These "delays" become part of the patterning instruction for each applicator, and, in an important sense, are not time-based. By having an encoder that precisely tracks the relative position of the substrate being patterned along the conveyor, the "delay" for control system purposes is based upon the occurrence of a predetermined number of encoder pulses between applicator actuations, and not the passage of a specified period of time.

Figure 5A:
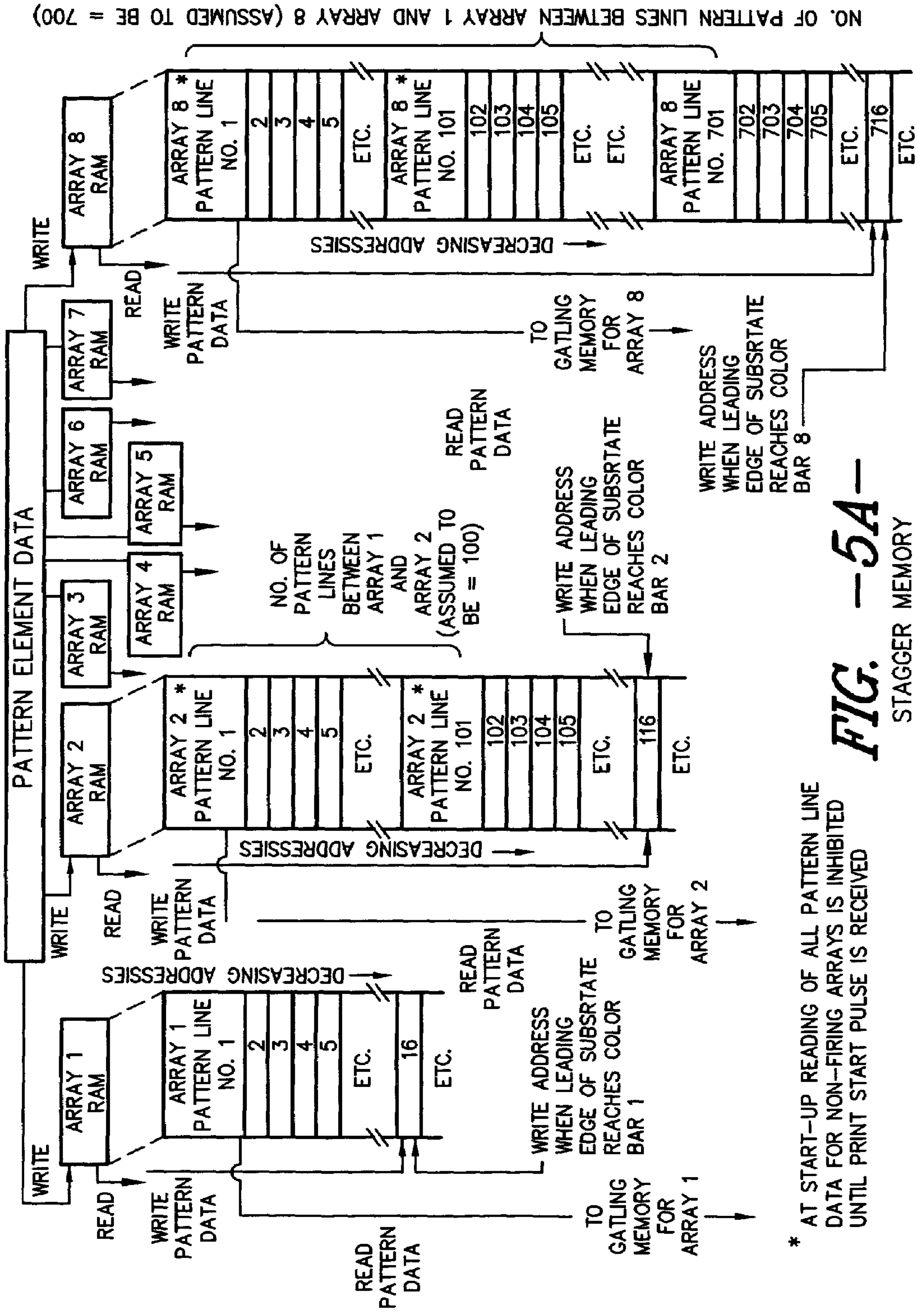
FIGS. 5A and 5B diagrammatically depict the operation of the “stagger” memory discussed herein.

When the data are read from the stagger memory shown in FIG. 5A, the data must be adapted to compensate for the diagonal offset positioning of the individual applicator orifices or jets in the valve cards using a "jet offset" algorithm associated with the stagger memory. This algorithm adds 2 lines to the line counter for each jet number (except jet 1) up to the eighth jet, reflecting the fact that the jets are separated in the machine direction (i.e., in a direction parallel to the conveyor motion) by a distance equal to two pattern lines. The ninth jet reverts back to the original line counter. Note that the line counter counts down, rather than up, to take advantage of the relative ease in digital arithmetic with which addition, rather than subtraction, may be performed. This is true for both inputting data to the stagger memory and reading data from the stagger memory.

Data read from the stagger memories must be read in the order in which they will be used for printing. Data are written into the stagger memories in a sequential fashion starting at the last line address and counting down. Reading begins at the last line address at the appropriate time and also counts down. Note that the memory is cleared upon reset so that the startup condition will operate correctly with the jet offset algorithm. The jets on the valve cards are spaced in three rows of eight jets with the jets in each row being laterally separated (i.e., in the direction parallel to the axis of the color bar, or perpendicular to the direction of substrate motion) by a uniform distance, e.g., 0.1 inches. The axis of the rows is in the direction of conveyor motion. The system prints at a gauge of 20 lines per inch (i.e. 20 pixels per linear inch). This means that in order for the pattern to print correctly, the data for jet 1 must be retrieved from the current pattern line, while the data for jet 2 must be retrieved from the current line plus 2, jet 3 from the current line plus 4 etc.

Figure 5B:
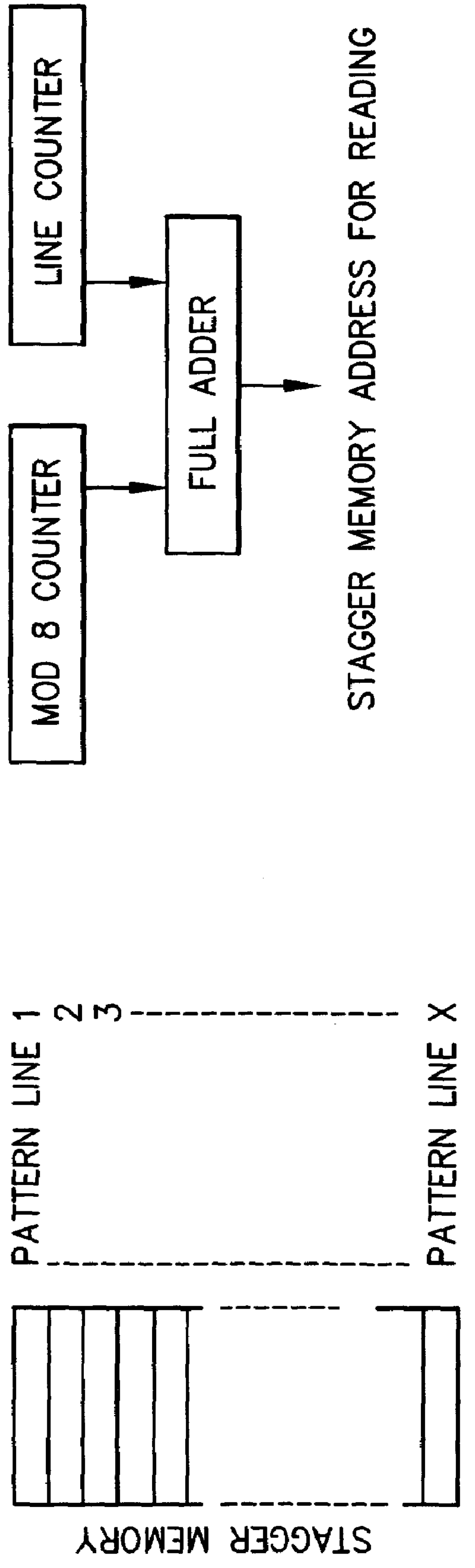

As shown in FIG. 5B, this algorithm is implemented by means of a line counter connected to a full adder. The second input to the adder is a second counter designed to count modulo 8 (repeating count 0-7). It is connected to shift its output one bit from the adder's input, thus multiplying by 2. By incrementing the modulo 8 counter for each jet address, the product of 2 times the jet number (mod 8) is added to the output of the adder, which is connected to the address of the stagger memories so that the appropriate data is delivered to the jet. An advantageous feature of this arrangement is that the line counter counts down so that the implementation can add rather than subtract, as discussed above. This algorithm can be modified to accommodate other valve card applicator arrangements (e.g., two rows of 12 applicators, involving a modulo 12 counter; differently-angled rows of jets, etc.)

As discussed above, when the data is coming out of the stagger memory, it is subjected to masking for tile machines (i.e., data is deleted if no tile is present).

This data deletion or masking is based on the tile present signal (which is passed from color bar to color bar with the print start signal, as described above) and number of tiles across the width of the transport. After the data is masked, it goes into the G-RAM where it transformed into optical data that can be transmitted to the Modems, which then distribute it to the driver cards that send parallel data to each of the valve cards.

Among the advantages of using dual port static memories for the stagger memory, the look up tables ("LUT"s), and the tuning memories are the following. Because the ports in the dual port static memories are completely independent, data can be written to the memory using one of the ports (e.g., "Port A") while, asynchronously, data is being read from the other port (e.g., "Port B"). In the case of the stagger memory, data coming from the computer (after being translated through the look up tables, base firing time memory, and tuning memory) goes into Port A of the stagger memory independently of the machine speed (assuming that the memory loading rate is at least marginally faster than the machine speed requirement, on average). Data comes out of Port B in real time when the machine speed requires it, independently of any writing activity at Port A. This greatly improves the efficiency of data transfer throughout the system by getting rid of complicated arbitration logic to synchronize these operations between input and output and also between colors. Removing the need for synchronization between colors allows each color to operate completely independently of each other. This assists in providing high resolution electronic color registration, described below. Similarly, and for the same reasons, dual port static memories are used for the tuning memories and LUTs. The computer can load these memories completely independently on Port A while pattern data is being translated through them on Port B.

Details of G-RAM

Returning to FIG. 4B, Step 48-1 depicts a process in which the firing time information for each applicator, expressed in millisecond-based units, is converted into a string of digital off/on valve actuation instructions and sent, in a coordinated, properly synchronized fashion (so that all applicators along a given color bar will start dispensing colorant at the same time), to the appropriate applicator valves mounted on the various valve cards comprising the color bar. The amount of colorant to be dispensed will depend upon the length of the string of "on" pulses (e.g., logical "one"="fire"), which, in turn, is dictated by the firing time duration code received from the stagger memory. This process is carried out using a "gatling" random access memory ("G-RAM" or "RAM") associated with each color bar and is implemented with a set of first-in, first-out memory modules (each of which may be referred to as a "FIFO"). An essential characteristic of the FIFO is that data are read out of the FIFO in precisely the same order or sequence in which the data were written into the FIFO.

The data from each RAM, having been sequenced to accommodate the substrate travel time between the arrays as well as the diagonally offset arrangement of the individual applicators within each valve card, is loaded into a collection of First-In First-Out memories (FIFOs). Each array is associated with an individual set of FIFOs. Each FIFO repeatedly sends its contents, one byte at a time and strictly in the order in which the bytes were originally loaded, to a comparator. The value of the byte, representing a desired elapsed firing time of a single jet along the array, is compared with a clock value which has been initialized to provide a value representing the smallest increment of time for which control of any jet is desired. As a result of the comparison, a firing command in the form of a logical "one" or logical "zero," which signifies that the jet is to "fire" or "not fire," respectively, is generated and, in a preferred embodiment, is forwarded to a shift register associated with the array, as well as to a detector. After all bytes (representing all jet locations along that array) have been sent and compared, the contents of the shift register are forwarded, in parallel, to the valve assemblies along the array by way of a latch associated with the shift register. Thereafter, the counter value is incremented, the same contents of the FIFO are compared with the new counter value, and the contents of the shift register are again forwarded, in a parallel format and via a latch, to the colorant valve assemblies in the array.

At some counter value, all elapsed firing times read from the FIFOs will be less than or equal to that value of the counter. When this condition exists at every array, fresh data, representing a new pattern line, is forwarded from the RAM in response to a transducer pulse indicating the substrate has moved an amount equivalent to one pattern line. This fresh data is loaded into the FIFOs and a new series of iterative comparisons is initiated, using a re-initialized counter. This process is repeated until all pattern lines have been processed.

Figure 6:
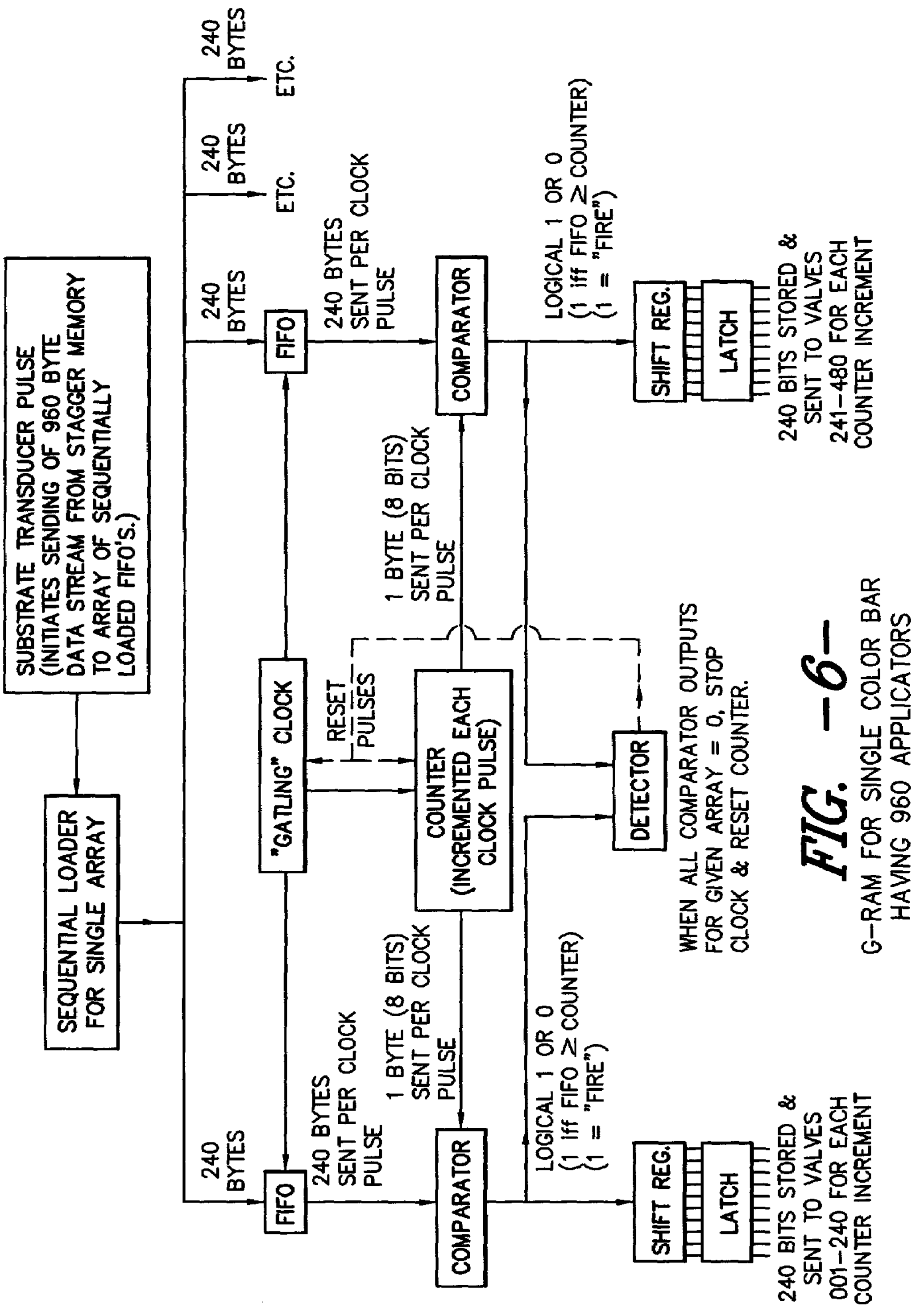
FIG. 6 schematically depicts the operation of the “gatling” RAM (“G-RAM”) discussed herein.

Amplifying the above description, FIG. 6 depicts a "gatling" memory module for a single color bar having, for discussion purposes, 960 applicators. For the patterning device depicted in FIG. 1, eight configurations of the type shown in FIG. 6 would be necessary, one for each array. In a preferred embodiment, the G-RAM for each color would be driven by a separate clock and counter. The gatling memory performs two principal functions: (1) the serial stream of encoded firing times is converted to individual strings of logical (i.e., "on" or "off") firing commands, the length of each respective "on" string reflecting the value of the corresponding encoded firing time, and (2) these commands are quickly and efficiently allocated to the appropriate applicators.

As depicted in FIG. 6, associated with each array is a set of dedicated first in-first out memory modules (each of which will be hereinafter referred to as a "FIFO"). An essential characteristic of the FIFO is that data is read out of the FIFO in precisely the same order or sequence in which the data was written into the FIFO. In the exemplary embodiment described herein, the set of FIFO modules must have a collective capacity sufficient to store one byte (i.e., eight bits, equal to the size of the address codes comprising the original pattern data) of data for each of the nine hundred sixty applicators in the array. For purposes of explanation, it will be assumed that each FIFO shown can accommodate two hundred forty bytes of data.

Each FIFO has its input connected to the sequential loader and its output connected to an individual comparator. A counter is configured to send an eight bit incrementing count to each of the comparators in response to a pulse from a "gatling" clock, The "gatling" clock is also connected to each FIFO, and can thus synchronize the initiation of operations involving all of the FIFO's and the respective comparators associated with each FIFO. If the smallest increment of time on which "firing time" is based is to be different from array to array, independent clocks and counters may be associated with each such array. Preferably, the output from each comparator may be operably connected to a respective shift register/latch combination, which serves to store temporarily the comparator output data before it is sent to the respective array, as described in more detail below. Each comparator output is also directed to a common detector, the function of which shall be discussed below. As indicated in FIG. 6, a reset pulse from the detector is sent to both the "gatling" clock and the counter at the conclusion of each pattern cycle, as will be explained below. The clock thus pulses once per smallest increment of time on which each "firing time" is based (e.g., 0.1 or 0.2 milliseconds).

In response to the transducer pulse, the respective stagger memories for each array are read in sequence and the data is fed to an array-specific sequential loader, as depicted in FIG. 6. The sequential loader sends the first group of two hundred forty bytes of data received to a first FIFO and the second group of two hundred forty bytes of data to a second FIFO. Similar operations are performed simultaneously at other sequential loaders associated with other arrays. Each byte represents a relative firing time or colorant stream contact time for an individual jet in the array. After each of the FIFO's for each array are loaded, they are simultaneously sent a series of pulses from the "gatling" clock, each pulse prompting each FIFO to send a string of bytes of data, in the same sequence in which the bytes were sent to the FIFO by the sequential loader, to its respective individual comparator. This FIFO "firing time" data byte is one of two separate inputs received by the comparator, the second input being a byte sent from a single counter common to all FIFOs associated with every array. This common counter byte is sent in response to the same gatling clock pulse which prompted the FIFO data, and serves as a clock for measuring elapsed time from the onset of the dye stream striking the substrate for this pattern cycle. At each pulse from the gatling clock, each FIFO sends its entire string of 240 bytes of data to its respective comparator.

At each comparator, the eight bit "elapsed time" counter value is compared with the value of each eight bit "firing time" byte sent by the FIFO. The result of this comparison is a single "fire/no fire command" bit sent to the shift register as well as the detector. If the FIFO value is greater than the counter value, indicating the desired firing time as specified by the pattern data is greater than the elapsed firing time as specified by the counter, the comparator output bit is a logical "one" (interpreted by the array applicators as a "fire" command) Otherwise, the comparator output bit is a logical "zero" (interpreted by the array applicators as a "no fire" or "cease fire" command). As each successive byte of firing time data (corresponding to the next individual jet along the array) is sent from each FIFO to the respective comparator, where it is compared with the same counter value. Each comparator compares the value of the firing time data forwarded by its respective FIFO to the value of the counter and generates a "fire/no fire" command in the form of a logical one or logical zero, as appropriate, for transmission to the shift register and the detector.

This process is repeated until all two hundred forty "firing time" bytes have been read from the FIFO's and have been compared with the "elapsed firing time" value indicated by the counter. At this time the shift register, which now contains a serial string of two hundred forty logical ones and zeros corresponding to individual firing commands, forwards these firing commands in parallel format to a latch. The latch serves to transfer, in parallel, the firing commands from the shift register to the individual valves associated with the array dye applicators at the same time the shift register accepts a fresh set of two hundred forty firing commands for subsequent forwarding to the latch. Each time the shift register forwards its contents to the latch (in response to a clock pulse), the counter value is incremented. Following this transfer, the counter value is incremented by one time unit and the process is repeated, with all two hundred forty bytes of "firing time" data in each FIFO being reexamined and transformed into two hundred forty single bit "fire/no fire" commands, in sequence, by the comparator using the newly incremented value of "elapsed time" supplied by the counter. While, in a preferred embodiment, the serial firing commands may be converted to, and stored in, a parallel format by the shift register/latch combination disclosed herein, it is foreseen that various alternative techniques for directing the serial stream of firing commands to the appropriate applicators may be employed, perhaps without converting said commands to a true parallel format.

The above process, involving the sequential comparison of each FIFO's entire capacity of firing time data with each incremented "elapsed time" value generated by the counter, is repeated until the detector determines that all comparator outputs for that array are a logical "zero." This indicates that, for all jets in the array, no desired firing time (represented by the FIFO values) for any jet in the array exceeds the elapsed time then indicated by the counter. When this condition is sensed by the comparator, it indicates that, for that pattern line and that array, all required patterning has occurred. Accordingly, the detector sends "reset" pulses to both the counter and to the gatling clock. The gatling module then waits for the next substrate transducer pulse to prompt the transmission and loading of firing time data for the next pattern line by the sequential loader into the FIFO's, and the reiterative reading/comparing process is repeated as described above.

In a preferred embodiment, the gatling memory for each array may actually consist of two separate and identical FIFO's which may alternately be connected to the array applicators. In this way, while data are being read out and compared in one gatling memory, the data for the next pattern line may be loaded into the FIFO's associated with the alternate gatling memory, thereby eliminating any data loading delays which might otherwise be present if only one gatling memory per array were used. It should be apparent that the number of individual FIFO's may be appropriately modified to accommodate a greater or lesser number of dye jets in an array.

Details of Seamless Overdrive

Shown in FIG. 4B at 50-1 as associated with, but separate from, the gatling memory is circuitry and software that serves to enhance the speed at which patterning can be performed in those cases in which a given applicator is to remain "on" for the entire base firing time and is to remain on through at least a portion of the next pattern line. It also allows the applicators to consume significantly less power under certain conditions.

It is known to use a pulse of relatively high voltage (at least several times higher than would be necessary to sustain the valve in the "on" position) to accelerate the actuation time of the applicators. The energy of a full pulse is not necessary, however, if the valve was already "on" during the previous machine cycle. Being able to identify the circumstances when the valve was "on" during the previous machine cycle can result in a considerable reduction in power consumption and heat generation, as well as unnecessary stress on the valve. This feature, referred to herein as "overdrive," allows the applicator to remain on continuously from one pattern line to the next, rather than having to stop and then re-start colorant flow, and operates by essentially identifying those times during which the full pulse of relatively high voltage is not necessary and effectively dissipating such full pulse by rapidly cycling the valve on and off to approximate the average energy the valve would receive in the absence of the full pulse.

Figure 8A:
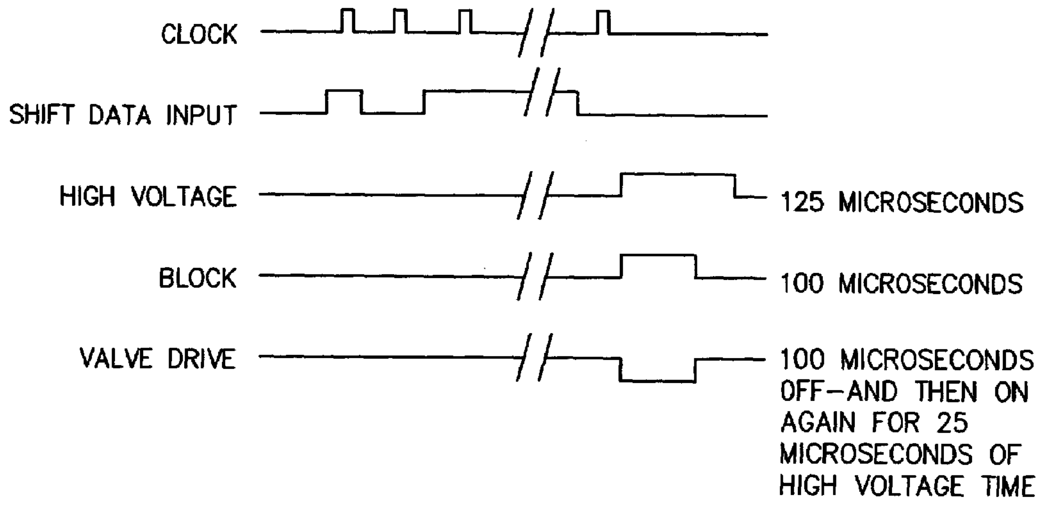
FIGS. 8A through 8D depict circuitry and various digital data and signal pulses, showing circumstances under which the “overdrive” feature is employed, and its implementation.
Figure 8B:
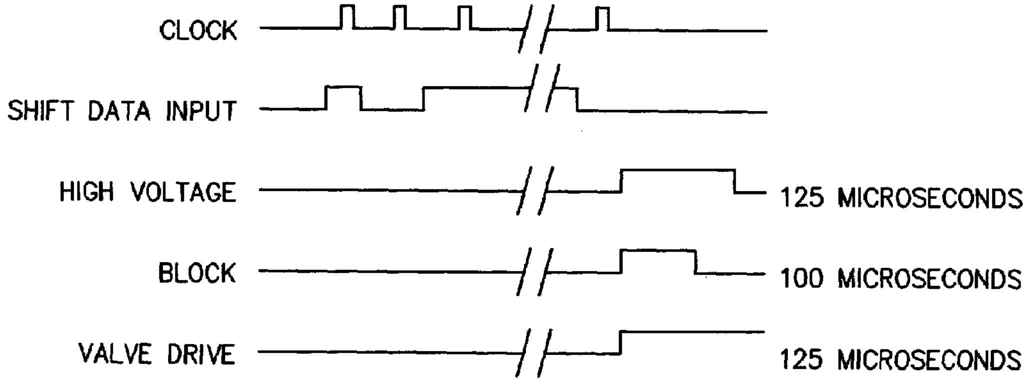

As depicted in FIG. 8A, the VALVE DRIVE pulse will be continually activated except when the BLOCK VOLTAGE pulse coincides with a digital "one" state on one of the output terminals Q1 through Q8 of the "previous" register. This will result in the VALVE DRIVE voltage pulse being "off" for the initial 100 microseconds and then "on" for the last 25 microseconds of the total 125 microsecond valve activation time. FIG. 8B represents the condition when there are no digital "one" states present on any one of outputs Q1 through Q8 of "previous" shift register. The VALVE DRIVE voltage pulse will then be "on" continually, because this valve was not on during the previous machine cycle. Accordingly, the HIGH VOLTAGE pulse is turning on the valve for the first time and will not be subject to the BLOCK voltage.

Figure 8C:
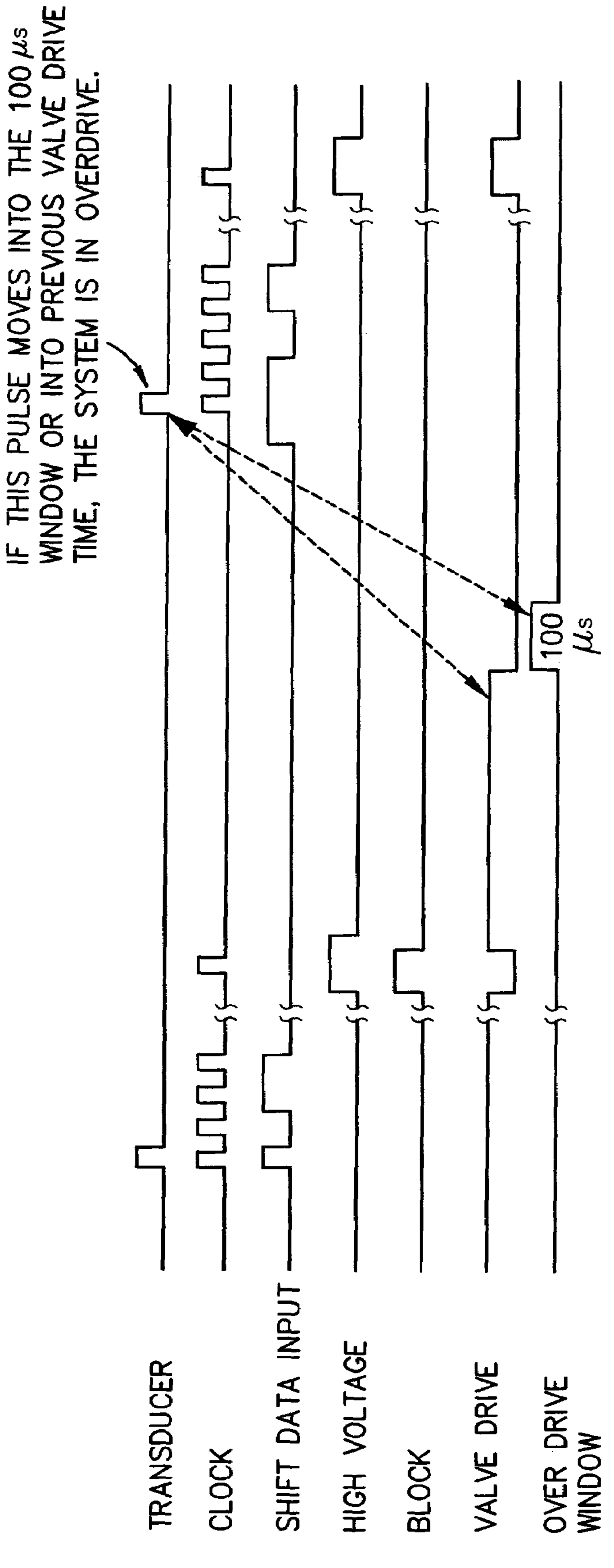
Figure 8D:
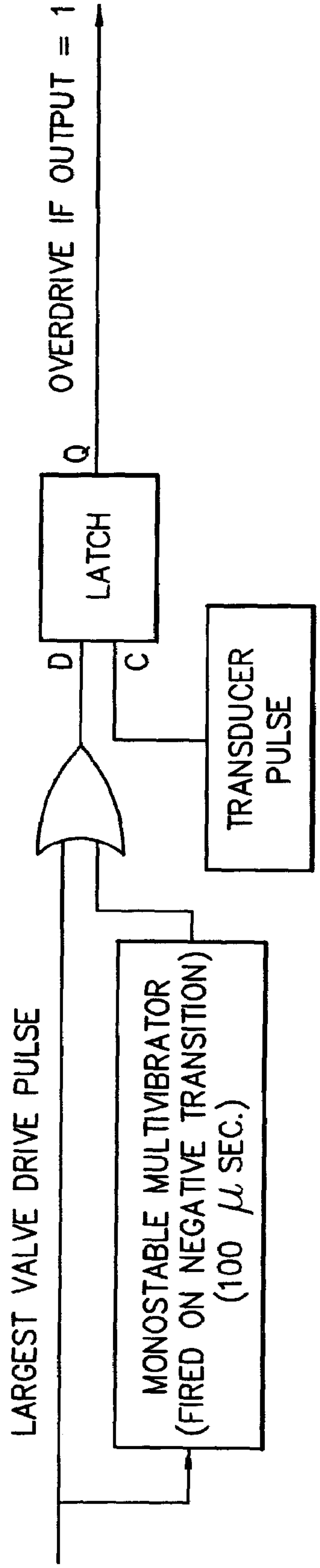

Importantly, this feature has been adapted to provide for such continuous colorant application even when the substrate speed has been altered. Depicted in FIG. 8C, this is accomplished by automatically sensing when the current cycle comes within, for example, 100 microseconds of the next cycle and activating the overdrive circuitry. The transducer pulse is the signal that causes the cycle to begin. If the next transducer pulse occurs during the valve drive time or during the 100-microsecond window following the valve drive time, the system is placed in overdrive mode. If the next transducer pulse occurs after the 100-microsecond window, the system is in firing time mode. No modification of the valve drive is performed in firing time mode. This allows the speed to be changed during printing from firing time mode to overdrive mode and back without damage to the valves. Prior implementations required patterning at a constant, pre-set speed when in overdrive mode, and did not allow for speed changes. One exemplary implementation of this feature is shown in FIG. 8D. Others will be readily apparent to those skilled in the art.

Figure 7:
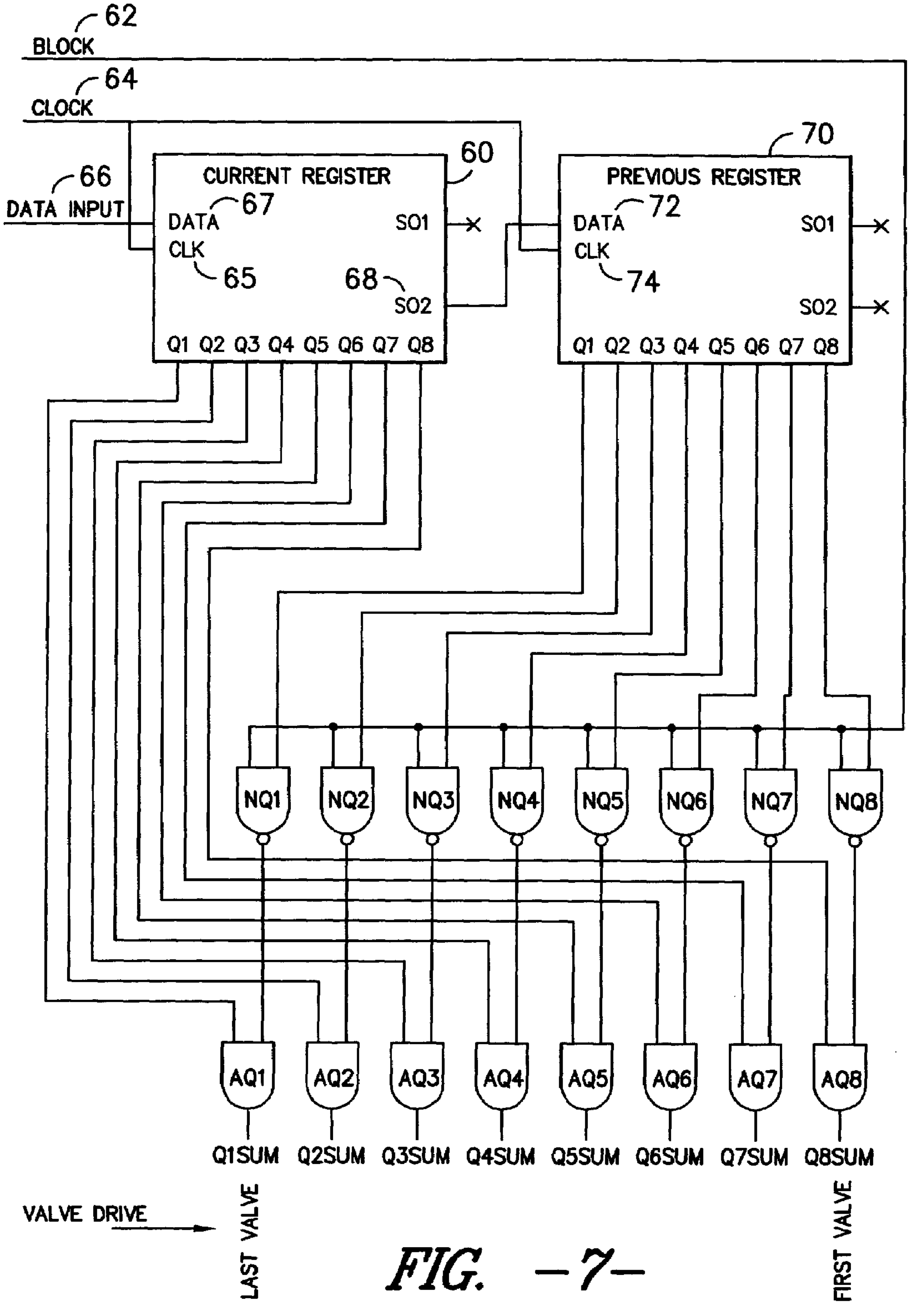
FIG. 7 schematically depicts a portion of the valve control system, as discussed in connection with the “overdrive” feature.

Details of this process are explained below, in conjunction with FIGS. 7 and 8A through 8C. As shown in FIG. 7, serial data is inputted into a "current" shift register 60 (i.e., a shift register for the current set of firing instructions) by means of a data input 66. A non-limiting example of a "current" shift register of this type is 74HC4094. This data is actually sequentially clocked into this register by means of CLOCK line 64. Data input line 66 is electrically connected to data input terminal 67 of current shift register 60. CLOCK line 64 is electrically connected to clock input terminal 65 of current shift register 30. A representative clock pulse that can be found on CLOCK line 64 is pictorially represented in FIGS. 8A through 8C ("CLOCK"), as is a data input voltage pulse that can be found on data input 62 ("SHIFT DATA INPUT"). Although any number of output terminals can be associated with current register 60, in a preferred embodiment there are eight output terminals represented as Q1 through Q8, respectively. Output terminals Q1 through Q8 of current register 60 are electrically connected to one of two inputs of a series of AND gates designated as AQ1 through AQ8, respectively. A non-limiting example of AND gates of this type would include 74H08.

The valve activation data leaves "current" shift register 60 by means of serial output S02, designated at 68, which is electrically connected to data input terminal 72 of a "previous" shift register (i.e., a shift register for the previous set of firing instructions) as generally indicated at 70. A nonlimiting example of a shift register of this type is 74HC4094. This serial data is clocked into "previous" register 70 by means of electrical connection between CLOCK line 64 and clock input terminal 74. The depicted embodiment of "previous" shift register 70 also has eight output terminals (indicated at Q1 through Q8). These output lines are electrically connected to one of the inputs of a series of eight NAND gates, designated as NQ1 through NQ8. A non-limiting example of such NAND gates of this type is 74HC00. The remaining input connections to NAND gates NQ1 through NQ8 are connected to BLOCK line 62. BLOCK line 62 is a voltage pulse, shown in FIGS. 8A-8C at "BLOCK," which is "on" for a percentage of time of the total time the actuator is receiving a "fire" signal, indicated at "HIGH VOLTAGE". This HIGH VOLTAGE signal is generated briefly to accelerate the initial transition of the applicator valve from "off" to "on" and consists of a voltage pulse that is significantly higher than that necessary to sustain the valve in the "on" position (e.g., if the valve requires 15 volts to remain "on," the pulse could be, for example, 100 volts).

A BLOCK voltage pulse is preferably of significant duration in relation to the total period of time in which the high voltage pulse is applied to the actuator. In the preferred embodiment, the high voltage pulse is in a high state for, for example, 125 microseconds while the BLOCK voltage pulse is activated in a high state for, for example, 100 microseconds. These pulse durations may vary for different valve types, etc.

Therefore, the output of NAND gates NQ1 through NQ8 will always be in a digital "one" state unless there is a positive BLOCK voltage pulse at the same time the output terminal of one of Q1 through Q8 of "previous" register 70 is in a digital "one" state or high state. Otherwise, in all remaining conditions of the output of NAND gates NQ1 through NQ8 will be in a digital "one" state. The outputs from NAND gates NQ1 through NQ8 are inputted to respective AND gates AQ1 through AQ8 in conjunction with the digital output terminals Q1 through Q8 of the "current" register. The output from AND gates AQ1 through AQ8 are outputted to control lines Q1SUM through Q8SUM, respectively. These control lines actuate the valves associated with the valve cards/colorant applicators.

By means of the above, the applicators will be continually activated except when there is a BLOCK voltage pulse in conjunction with a digital "one" state on one of the output terminals Q1 through Q8 of the "previous" register 70. This will result in the voltage pulse labeled VALVE DRIVE causing the associated valve to be off for the initial 100 microseconds and then on for the last 25 microseconds of an overall 125 microsecond activation time.

Having discussed several of the major elements of the control system disclosed herein, the following will provide additional details concerning the means by which these respective activities and functions are carried out and coordinated.

The pattern data to be used can be in any appropriate pixel density. For example, the pattern can be expressed either in "high definition" form (e.g., specifying 20 pattern elements or pixels to the linear inch, or 400 pattern elements or pixels per square inch of patterned substrate) or in "low definition" form (e.g., 10 pattern elements or pixels to the inch, or 100 pattern elements or pixels per square inch of patterned substrate). Additionally, the number of bits allocated to specify the various pattern elements is selected based on need—patterns with a greater number of colors are provided with a larger number of bits, thereby allowing simpler patterns to run more efficiently by utilizing a smaller number of bits to specify color. Typically, as for purposes of discussion herein, a 12 bit color code will be assumed. The pattern itself may be thought of as a pixel-by-pixel map in which each color for each pixel is defined in terms of the 12 bit color code.

The control system described herein is designed to be used in conjunction with a host computer (e.g., an appropriately configured PC server with a Microsoft Windows 2000® Professional operating system or a more recent operating system) having two high speed parallel DMA output cards (e.g., ADLINK® PCI-7300A). One such card (which, for purposes of discussion, will be referred to as the "Data Port") is used solely to output pattern data along with some embedded control information. The other card (which, for purposes of discussion, will be referred to as the "LUT/Control Port") is used to output look up tables and tuning tables (to be defined below), as well as global setup and control information, including a number of general purpose output signals that are used to control the process. The LUT/Control Port is also used to read status information from the patterning apparatus to allow the control system to achieve interactive control. Details of these ports are discussed below.

Figure 9:
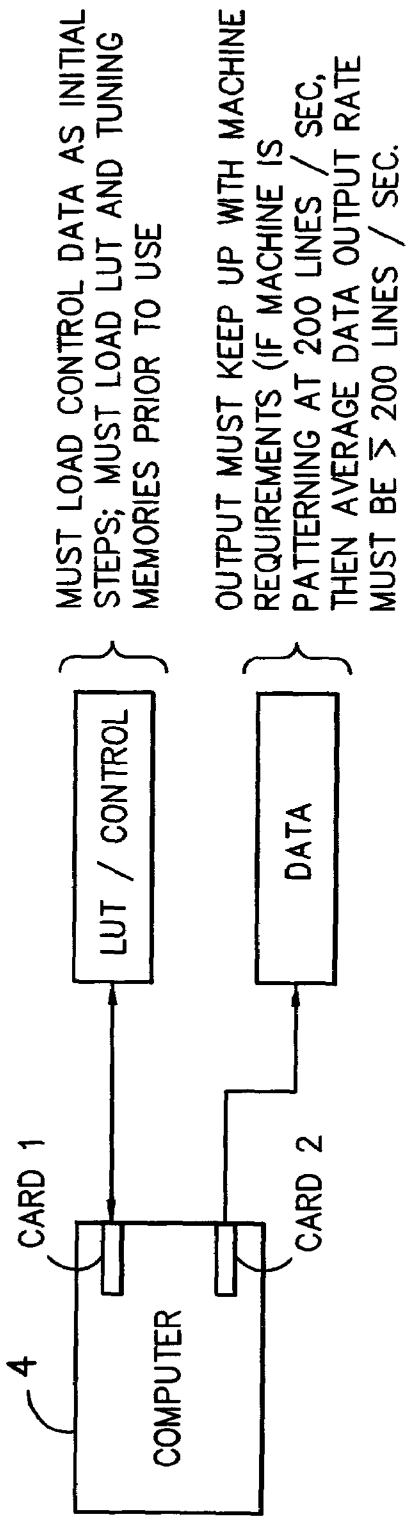
FIG. 9 schematically depicts the two port architecture discussed herein.

FIG. 9 depicts this separate data stream architecture. Computer 4 contains the two high speed output cards. Card 1 is used to output look up tables, tuning tables, and global setup and control information as mentioned above, which must only be done prior to the time the information is needed (i.e. a particular look up table must be loaded before the data channel references it). Card 2 outputs the pattern data. This output must be operated in pseudo real time (i.e. sufficiently "real time" to keep up with the machine requirements). The DMA card's output rate preferably is faster than the maximum machine speed requirement, to allow the card sufficient time to burst data and prepare for the next burst in timely fashion.

The LUT/Control Port:

The LUT/Control Port card is split into a 16 bit output port and a 16 bit input port. The 16 bit output port is used to output information to the hardware. The lower 8 bits of this port are data (e.g., control data, LUT data, or tuning data). The next 3 bits are used as steering bits to direct the data to the appropriate place in the hardware. One possible configuration of the steering bits 10 through 8 is as follows:

1
098
0 0 0=Idle State
0 0 1=Control Data 0 1 0=LUT Data 0 1 1=Tune Data

The remaining bits (bits 16 through 11) are used in connection with 4 general purpose output signals ("AUX OUT" on FIG. 10) to control the hardware, as follows:

1. Master Reset—This is used to return the hardware to a known state during startup, when errors occur, or when it is necessary to cancel the printing process. The computer asserts this signal for some time period (~100 msecs) and then de-asserts it.
2. Xdcr Enable—This is used to enable the transducer. When the computer is completely setup and ready to run, it can assert this signal which enables the transducer pulses to run the hardware. Note that this works with both the simulated transducer and the encoder from the machine.
3. Print Start Enable—This is used in tile mode to enable the print start signal to come into the system. It works in normal and simulated modes. In broadloom mode, asserting this signal could generate the print start that initiates the system.
4. Status Readback Enable—This signal is used to trigger readbacks from the hardware into the input port of the LUT/Control Port. When it is low, the hardware will not send a readback. When it transitions from low to high, the computer is ready to accept one status readback when the hardware needs to send one. When the signal is high, the computer is waiting on one status readback or, if that has already occurred, the computer is not yet ready for another one (i.e. the hardware should wait for another low to high transition before sending another readback).

Details concerning the control data, LUT data, and tune data are given below.

The control data are used by the control logic to set up the hardware to control the patterning machine. The control logic coordinates the other functions of the hardware based on the control data. One possible format of the control data is defined below. It should be noted that, here and elsewhere herein, the listing of functions assigned to various bits may include functions that are not discussed in detail.

Control Data:
Byte 1 = Bit Control 1
Bit 0 = Machine Mode (1=Tile, 0=Broadloom)
Bit 1 = Transducer Select (1=Simulator, 0=Encoder)
Bit 2 = Valve Card Stagger Inhibit
Bit 3 = Print Start Simulator Enable
Bit 4 = LUT Inhibit
Bit 5 = Firing Time Xlat Inhibit
Bit 6 = Width (0 = 960, 1 = 1920)
Bit 7 = Tuning Inhibit
Byte 2 = Bit Control 2
Bit 0 = G-RAM Inhibit
Bit 1 = Bar Inhibit
Bit 2 = LUT Test
Bit 3 = CPU Input Test
Bit 4 = Stagger Memory Test
Bit 5 = Tuning Test
Bit 6 = G-RAM Test
Bit 7 = Bar Test
Byte 3 = Bit Control 3
Bit 0 = Sequencer Test
Bit 1 = Communication Test -continued Bit 2 = Halt on Error
Bit 3 = Tile Mask Disable
Bits 4-7 = Test Select
7654
0000 = Even (0xAA)
0001 = Odd (0x55)
0010 = Noise
0011 = Prime
0100 = FT Pattern (Even (0xAA), Odd (0x55), Zero)
0101 = Spare
0110 = Spare
0111 = Spare
1000 = Spare
1001 = Spare
1010 = Spare
1011 = Spare
1100 = Spare
1101 = Spare
1110 = Spare
1111 = Spare
Byte 4 = Bit Control 4
Bits 0-1 = Tiles Across Width
10
00 = 1
01 = 2
10 = 3
11 = 4
Bits 2-3 = Mask Select
32
00 = Select 1 (Equally Sized Lanes)
01 = Select 2 (Not defined)
10 = Select 3 (Not defined)
11 = Select 4 (Not defined)
Bit 4 = Enable stability data readback
Bit 5 = Valve Power Disable
Bit 6 = Enable Valve Card ID readback
Bit 7 = Spare
Byte 5 = Bit Control 5
Bits 0-1 = Firing Time Resolution
10
00 = .1 msec
01 = .2 msec
10 = spare
11 = spare
Bit 2 = LUT % Resolution (0=1%, 1=½%)
Bits 3-7 = Spare
Byte 6 = Bit Control 6 (Spare)
Bytes 7&8 = Transducer Simulator Divisor (Note: In this example, the base simulator frequency is 1,000,000. This divisor divides that clock to high resolution pulses per second. The formula for calculating this divisor is ((Base_freq * length_gauge * 60)/(ppi * spm)) where ppi is high resolution pulses per inch and spm is desired shots per minute (i.e., colorant applicator dispensing events). Another formula (using ft/min. rather than shots/min) is ((Base_freq * 60)/(ppi * ft_per_min * 12)).
Bytes 9&10 = Print Start Simulator Divisor (Note: This is in low resolution pulses, i.e. to get a print start 2 lines after the end of a 100 line tile, set this to 102)
Byte 11 = Transducer Divisor (This converts high resolution pulses to low resolution pulses for both the machine xdcr and the simulated xdcr)
Byte 12 = Sequencer Test High Resolution Remainder
Bytes 13&14 = Tile Length in Lines (Any pattern lines past this number will not be masked - this is for the auto purge between tile lines)
Bytes 15&16 = Print Start Delay for Bar 1 (High Resolution Pulses)
Bytes 17&18 = HR Pulses Between Bars 1 and 2
Bytes 19&20 = HR Pulses Between Bars 2 and 3
.
.
.
Bytes (((NbrofBars − 1) * 2) + 15)−(((NbrofBars − 1) * 2) + 16) = HR Pulses Between Last 2 Bars One possible format of the LUT data is as follows:

```
LUT Data:
    Byte 1 = Low half of LUT No.
    Byte 2
        Bit 0 = Bit 8 of LUT No.
        Bit 1 = LUT Size is 64 per Bar
        Bit 2 = LUT Size is 128 per Bar
        Bit 3 = LUT Size is 256 per Bar
        Bit 4 = LUT Size is 512 per Bar
        Bit 5 = LUT Size is 1024 per Bar
        Bit 6 = LUT Size is 2048 per Bar
        Bit 7 = LUT Size is 4096 per Bar
    Bytes 3-(LUT Size + 2) = LUT data for Bar 1
    Bytes (LUT Size + 3)-(LUT Size + LUT Size + 2) =
    LUT data for Bar 2
.
.
.
    Bytes (((NbrOfBars - 1 ) * LUT Size) + 3)-((NbrOfBars *
    LUT Size) + 2) = LUT data for last Bar
```

The "Tune Data" refers to data used by the optional tuning LUT to make fine adjustments to each applicator to compensate for slightly higher or lower colorant flow rates, outside the "normal" performance range, associated with that specific applicator. The upper 5 bits are not used. Tuning data are usually loaded into the hardware before a run. The tuning tables are used to modify firing times by jet in order to compensate for jet to jet variations. One possible format of the tuning data is as follows:

```
Tuning Data:
    Bytes 1-256 = High Table for Jet 1 Bar 1
    Bytes 257-512 = Low Table for Jet 1 Bar 1
        .
        .
        .
    Bytes ((512 * (MachineWidth - 1)) + 1)-((512 * (MachineWidth -
    1)) + 256) = High Table for Last Jet Bar 1
    Bytes ((512 * (MachineWidth - 1)) + 257)-((512 * (MachineWidth -
    1)) + 512) = Low Table for Last Jet Bar 1
    Bytes ((512 * MachineWidth) + 1)-((512 * MachineWidth) + 256) =
    High Table for Jet 1 Bar 2
    Bytes ((512 * MachineWidth) + 257)-((512 * MachineWidth) + 512)
    = Low Table for Jet 1 Bar 2
        .
        .
        .
    Bytes ((512 * ((2 * MachineWidth) - 1)) + 1)-((512 * ((2 *
    MachineWidth) - 1 )) + 256) = High Table for Last Jet Bar 2
    Bytes ((512 * ((2 * MachineWidth) - 1 )) + 257)-((512 * ((2 *
    MachineWidth) - 1)) + 512) = Low Table for Last Jet Bar 2
        .
        .
        .
    Bytes ((512 * ((NbrofBars - 1) * MachineWidth)) + 1)-((512 *
    ((NbrofBars - 1) * MachineWidth)) + 256) = High Table for Jet 1
    Last Bar
    Words ((512 * ((NbrofBars - 1) * MachineWidth)) + 257)-((512 *
    ((NbrofBars - 1) * MachineWidth)) + 512) = Low Table for Jet 1
    Last Bar
        .
        .
        .
    Bytes ((512 * ((NbrofBars * MachineWidth) - 1)) + 1)-((512 *
    ((NbrofBars * MachineWidth) - 1)) + 256) = High Table for Last Jet
    Last Bar
    Bytes ((512 * ((NbrofBars * MachineWidth) - 1)) + 257)-((512 *
    ((NbrofBars * MachineWidth) - 1)) + 512) = Low Table for Last Jet
    Last Bar
```

When the computer needs to output either control data, LUT data, or tune data, it will set the appropriate code in bits 10-8 for all transfers for that set of data. At the end of the data set, it will set the code back to the idle state such that the normal state is the idle state allowing the hardware to trigger on the transition from idle to one of the other states to wake up and process the incoming data.

The other half of the LUT/Control port is used as a 16 bit input port. This is where the hardware can report pertinent information to the computer. There are three categories of information that can be reported. The first is normal mode information which is sent back periodically while running to report current machine status. The second type of information is transport stability data that can be collected in an offline maintenance mode. The third type of information is valve card ID's that can be collected in an offline mode by the computer on a "need to know" basis. The readback logic collects and formats the readback data and sends them to the computer at the appropriate times based on the instructions sent to it from the control logic. One possible format of the input data is as follows:

```
Bits 15-13 Word code
                1 1 1
                5 4 3
                0 0 0               Status 1
                0 0 1               Status 2
                0 1 0               Ratio 1
                0 1 1               Ratio 2
                1 0 0               Stability
                1 0 1               Spare 1
                1 1 0               Spare 2
                1 1 1               Spare 3
Details of each (i.e., definitions of remaining bits 12-0) are given
below.
    Status 1:
        Bit 12 = Minor Malfunction
        Bit 11 = Major Malfunction
        Bit 10 = Control Room Temperature Malfunction
        Bit 9 = Error
        Bit 8 = Spare
        Bit 7 = Valve Power On
        Bit 6 = Range Running
        Bit 5 = Seam Detect
        Bit 4 = Print Start
        Bit 3 = Tile Not Present in Position 4
        Bit 2 = Tile Not Present in Position 3
        Bit 1 = Tile Not Present in Position 2
        Bit 0 = Tile Not Present in Position 1
    Status 2:
        Bit 12-0 = Lines since last Start of Tile when Seam Detect
        encountered (0 - 8191)
    Ratio 1:
        Bits 12-0 = Low 13 Bits of Ratio
    Ratio 2:
        Bits 6-0 = High 7 Bits of Ratio
        Bits 12-7 = Spare
Note on Ratio: Ratio is a measure of transport skew when in tile
mode, and is measured by comparing high resolution real print
start sensor pulses taken from opposite sides of the transport. It
should remain constant unless the transport is skewed. In
broadloom mode, it is the number of high resolution pulses for a
given predetermined motion of the transport.
    Stability (i.e., conveyor speed consistency):
        Bits 7-0 = Stability (0 to 25% worst case since last report)
        Bits 12-8 = Spare
```

Stability mode: When requested by setting the Enable stability data readback bit, the hardware will transfer one word containing the time between the previous 2 high resolution transducer pulses as long as the input channel will accept the data. These time stamps are in microseconds. Note that the readback begins after the Status Readback enable bit (Control Port general purpose output bit 3, i.e. AUXO3) is set.

```
Word 1:
    Bits 15-13 = Word Code (101)
    Bits 12-0 = Transducer time stamp for pulse 1
Word 2:
    Bits 15-13 = Word Code (101)
    Bits 12-0 = Transducer time stamp for pulse 2
    .
    .
    .
Word N:
    Bits 15-13 = Word Code (101)
    Bits 12-0 = Transducer time stamp for last pulse
```

Valve Card ID mode: Each of the valve cards in the printer has an identification programmed into the card. This ID is in the form of a 20-bit number, which uniquely identifies the card to the control system. When asked or polled by the control system, each of the cards sends, in serial fashion, its unique 20-bit number to the control system where the position of each card is logged. The control system maintains a log of the operational parameters for each applicator on each of the cards. Knowing the location of the cards and the operational parameters of each applicator on each card allows the control system to compensate for any flow rate differences among applicators, regardless of their location, on any color bar.

When requested by setting the Enable Valve Card ID readback bit, the hardware will transfer two words for each valve card (21) for each color bar. The words are in the following format:

```
Word 1:
    Bits 9-0 = Low 10 Bits of the Valve Card ID
    Bits 15-10 = Not Used
Word 2:
    Bits 9-0 = Upper 10 Bits of the Valve Card ID
    Bits 15-10 = Not Used
```

The hardware always reports the maximum number of bars (i.e. 40) and maximum number of cards (i.e. 40 for a patterning machine having 960 applicators/color bar, 80 for a patterning machine having 1920 applicators/color bar, and 160 for a patterning machine having 3840 applicators/color bar). The software will setup the DMA for all cards and bars, set the Enable Valve Card ID readback bit, and wait a sufficiently long time to allow the hardware to gather and report the Valve Card ID's XDCR (transducer) is an incremental rotary encoder which provides synchronization between the movement of the transport and the control system. Each tile or group of tiles is sensed by the print start sensor. The tile sensors are used to confirm to the control system the presence of substrate (e.g., a carpet tile) at that position on the transport. Sensors (18) may be capacitive, optical, or use some other conventional technology. The XDCR Interface coordinates with the Control Logic and the Readback Logic to properly handle these signals.

Seam Detect is a signal that indicates the presence of a seam when running in broadloom mode. The computer uses this information to properly optimize printing around seams.

The Data Port:

The pattern data is accessed through this port line by line. Line width is Machine Width, measured in pixels or, equivalently, number of jets spaced across the width of the conveyor (i.e. 960 jets for 1 meter tile machines, 1920 jets for 2 meter machines, and 2 channels, each operating with 1920 jets, for 4 meter machines). LUT select words or base firing time words are not counted as part of line width.

The patterning machine is adapted for use with a wide substrate, such as, for example, 4-meter-wide broadloom carpeting in continuous web form. This is accomplished by organizing the hardware into 2 duplicate independent channels (indicated by the arrow near the bottom of FIG. 11)—one channel handles the left side of the machine and a separate, identical channel (not shown in FIG. 11) handles the right side. To accommodate this change, the computer 4 simply changes its port width to 32 bits, using the lower 16 bits go to one channel and the upper 16 bits go to the other channel. The hardware includes a card that directs these two data streams to identical but separate card files. The LUT/Control port data goes unaltered to both of these card files. This architecture provides the control system with the ability to control wide patterning machines with the same performance as machines half the width because the computer interface can output either 16 or 32 bits (or, generalizing, n bits or n/2 bits, where n is the maximum word length) at the same data rate.

Note that for the single 16 bit channel machines, the total transfer will be padded with an extra LUT select to make sure the total transfer is an even number of words. For wider machines, the high order channel is used also and will not need to be padded since each transfer is 32 bits (a multiple of 4 bytes). The quantity will be evenly split between the two channels. Each word may be formatted as follows:

```
Bit 15-13 → Steering bits
    1 1 1
    5 4 3
    0 0 0 = data in the middle of a line
    0 0 1 = data for jet 1 (start of line)
    0 1 0 = data for last jet (end of line)
    0 1 1 = this word is LUT select
    1 0 0 = this word contains base firing time
    1 0 1 = data for jet 1 (start of line) at the first line of a tile
    1 1 0 = data for last jet of last line of a tile
    1 1 1 = spare
Bit 12 = ByPass Base FT XLAT if set (used for purge between tiles)
Bits 11-0 = pattern data (0-4095)
        Or
Bits 12-10 = Spare
Bit 9 = Zero Data out of LUT (Set = Zero) (Even works with LUT
Inhibited)
Bits 8-0 = LUT # to use for subsequent pattern data (0-511)
        Or
Bits 12-8 = Spare
Bits 7-0 = Base firing time for Color Bar "x" in firing
time increment units (e.g., 0.1 or 0.2 milliseconds). When the steering
bits change to base firing time, the first color bar's base firing time
will be contained in this word. Subsequent words with the steering bits
set to base firing time will contain the subsequent respective color
bar's base firing times. When the steering bits change to something else,
the hardware will reset to looking for Color Bar 1's base firing time the
next time the steering bits change to base firing time again.)
```

Hardware Organization:

The control system hardware is divided up into cards. There is one card that is connected to the Data Port (the output card). There is one card that is connected to the LUT/Control Port (the input card). There are three cards per color (the CPU, the Memory card, and the G-RAM card). All the cards plug into motherboards that route the signals between cards. Since there are multiple motherboards/card files, additional cards are used to transfer the signals between the card files. There are specific slots for each of the cards, for each color bar. The CPU cards can identify the cards for each color bar through ID signals from the motherboard, and can select the proper specific information for that color coming down the bus (i.e. LUT data, control data, and Tuning data).

Figure 10:
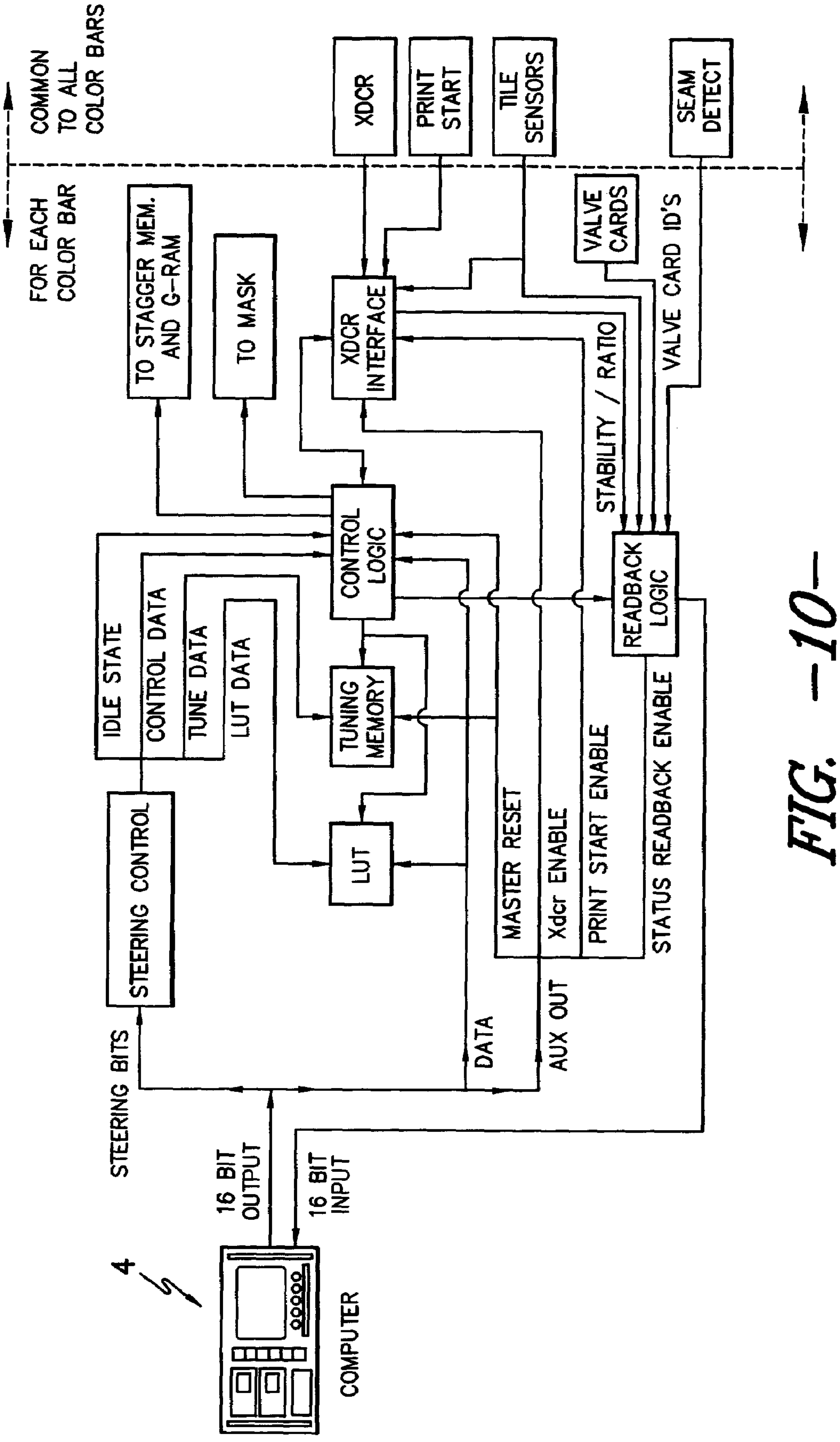
FIG. 10 schematically depicts details of the LUT/Control port, as discussed in detail herein.
Figure 11:
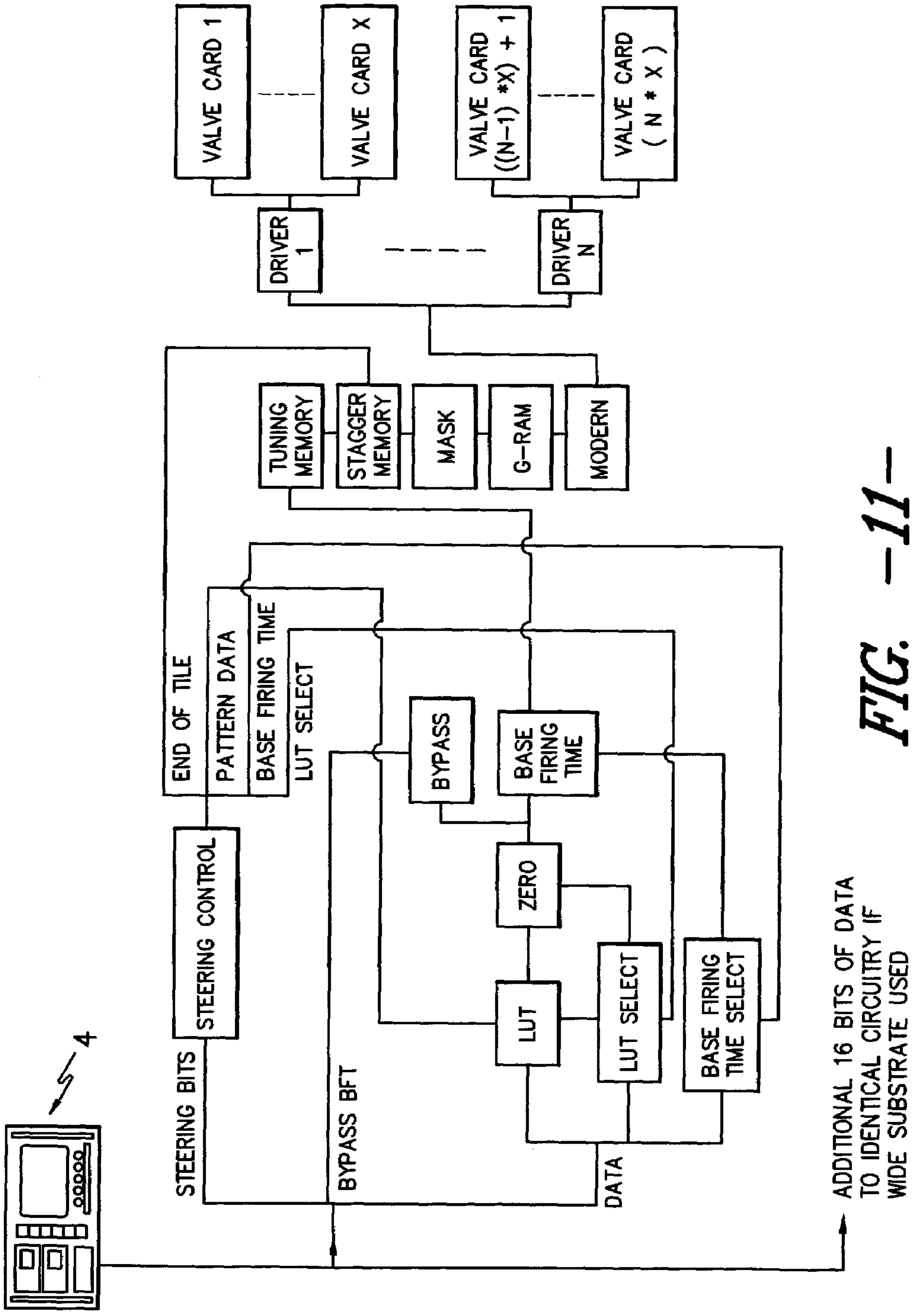
FIG. 11 schematically depicts details of the Data Port for a given color bar. An identical arrangement would be used, for each color bar, to accommodate use of this control system with a wide patterning device. In that case, one arrangement would serve the left half of the patterning device and the other the right half.

FIG. 10 depicts the flow of setup and control information from the computer to the hardware. FIG. 11 depicts the flow of pattern data through the hardware from the computer to the valve cards. Note that the LUT box, as well as the tuning memory box, is the same for both Figures. The control logic controls the flow of data as depicted in FIG. 11. The basic startup procedure is for the computer to issue a Master Reset, then load the control data, load the tuning data (if it is to be used), load necessary LUT's, setup the output data for the Data Port, and then enable the Xdcr and Print Start. The hardware preloads 16 lines of data (i.e. one line of data is enough pattern information to print $1/20^{th}$ of an inch along the length of the substrate for all colors) from the computer through the LUT's, base firing time, and tuning memory into the stagger memories. Note that the "END OF TILE" indicator is stored in the stagger memory, along with its respective applicator's data. Its function is described below. For tile machines, the output would consist of an entire tile or set of tiles (across the width). For broadloom machines, the output would consist of N lines where N is sufficiently large to assure that the patterning machine would run continuously in real time.

The computer waits for the output to finish (i.e. the hardware accepts the entire output), then sets up the next output. At the same time, the computer enables the status readback and begins accepting and processing the status of each of the color bars. For tiles, the status contains print start and tile presence data, to allow the system to determine the number of tiles that have been printed. If broadloom carpet is being patterned, the equivalent information (i.e., quantity patterned) can be determined by tracking the number of lines sent out the Data port. The status readback contains a seam detect signal as well as a count of lines since last start of tile, for purposes of determining exactly when a seam will reach color bar 1. This information can be used to properly adjust what is printed around seams to minimize waste.

A typical sequence of events for a tile machine begins with the machine starting to run and generating the Xdcr pulses. Each high resolution pulse (e.g., 240 pulses per inch) is received by the Xdcr Interface. When the Xdcr Interface receives the print start signal indicating a tile is close to the position to be printed for this color, it begins counting the high resolution delay for this color and determines the presence (or absence) of the tile(s). When the proper delay is reached, the Xdcr interface begins dividing the high resolution pulses down to the printing gauge (e.g., 20 pulses per inch) and sends these pulses to the Control Logic, which passes the print start signal onto the next color bar and begins an output cycle upon receipt of the first of the low resolution pulses. The output cycle transmits one line of data from the stagger memory through the mask logic (used to inhibit printing when no tile is present) into the G-RAM. The control logic provides the mask logic with the tile presence information previously sensed by the Xdcr Interface when the print start signal occurred. The mask logic zeroes the data if no tile(s) are present, but otherwise passes the data through to the G-RAM. Simultaneously, the output cycle starts the G-RAM to output a line of data to the driver cards through the modem. Because the G-RAM is double buffered, it can output data from a first buffer while receiving the next line of data into the second buffer from the stagger memory. Note that the output sequence from both buffers is blocked until at least one of the buffers is loaded. Once the output cycle is completed, the control logic initiates an input cycle to replace the line of data that was just transmitted by the G-RAM. The input cycle receives another line of data from the computer, translates it through the LUT, BFT (base firing time), and tuning memories, and places it in the stagger memory. The control logic continues the above sequence until it receives the end of tile indicator from the stagger memory, which causes the control logic to shut down until the next print start signal is received.

The broadloom sequence is similar to the tile sequence, except that the control logic generates only one print start signal, (from PRINT START ENABLE), and the control logic ignores signals from the print start sensor, as well as the end of tile indicator and thus never shuts down.

The high order bits in the data stream are routed to the steering control logic. These bits are decoded into End of Tile, Pattern Data, Base Firing Time ("BFT"), and LUT Select. These bits control where the data bits are routed. The output data stream thus drives the hardware data flow, synchronized with the high resolution pulses generated by rotary encoder. Embedded in the data stream is the identity of the LUT to be used for the accompanying data. This LUT selection data also has a bit that can be used to zero all data in the LUT. This feature is useful for masking the edges on broadloom and zeroing all of the non printing jets for tile registration. Also embedded in the data stream are the base firing times for all colors. By having a separate means to specify the base firing time to be used, the system can avoid re-loading the LUT's for a simple change in base firing times. Note that, for diagnostic purposes, the pattern data can contain a bit that can be used to bypass the base firing time translation memory. Lastly, embedded in the data stream are markers for start of line, end of line, start of tile, and end of tile. The hardware uses these markers to synchronize certain functions, such as the end of tile indicator, described above.

Figure 12:
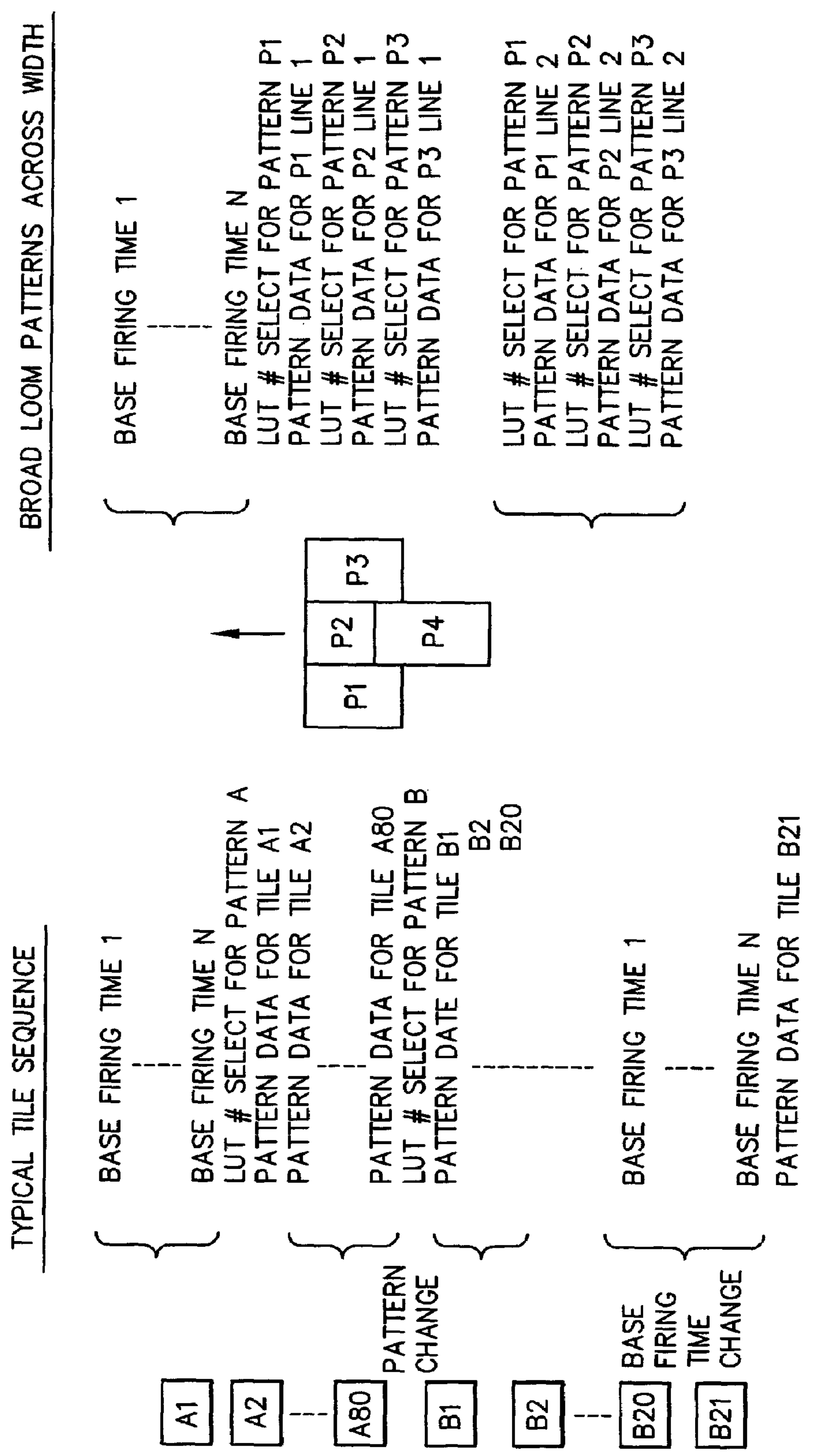
FIG. 12 schematically depicts the data sequence (to be read from top to bottom) of the patterning of a tile substrate (left side of Figure) or a broadloom substrate (right side of Figure), as discussed in detail herein.

FIG. 12 shows typical data sequences (to be read from top to bottom) for the data port for tile machines and for broadloom machines. A tile machine would first output the base firing times. Next would be a Look Up Table Select for the first pattern to be printed (A). The selected Look Up Table would have been. previously loaded through the LUT/Control port. The computer would then output pattern data for the first tile for pattern A. The pattern data are repeated by the computer for all subsequent tiles until the requested number of tiles (e.g., 80) tiles for pattern A has been printed. The computer can then select the LUT for the next pattern B. Pattern data for pattern B are then output until the desired number of tiles (e.g., 20) has been printed. The computer then outputs a new set of base firing times, to accommodate use of a different carpet substrate. This changes the base firing times for pattern B without the need for reloading pattern B's look up table. The computer then resumes outputting pattern B's data to print tiles 21+ on a different carpet substrate. This example shows the flexibility provided by embedding the LUT select and base firing time data (referred to herein as embedded control) into the data streams for tiles. Note that an alternative method to use this flexibility would be to have multiple tiles across the width and change the LUT select data for each tile within a line of pattern data, thereby allowing an entirely different pattern to be printed on each tile across the machine width.

The right half of FIG. 12 shows this concept for a broadloom application. Here, multiple independent patterns (schematically indicated by the contiguous blocks P1 through P4), in varying sizes, are to be positioned across the width of the broadloom (i.e., with the left side of P1 along the left edge of the broadloom substrate and the right side of P3 along the right edge of the broadloom substrate). In this example, the computer would first output the base firing times, which could be done at any point in the patterning process where change in the overall amount of liquid delivered to the substrate is desired. Note that different patterns could, in theory, require different base firing times, even if the substrate remained unchanged. Next the computer outputs the LUT select for pattern P1, followed by the pattern data for the first line of pattern P1. This is followed by the LUT select for pattern P2 and the pattern data for the first line of pattern P2, and, in similar fashion, the LUT select for pattern P3 and the pattern data for the first line of pattern P3. This sequence is repeated for the next line of data. When pattern P2 is completed, the computer will provide the LUT select for pattern P4 (which follows pattern P2 in the machine direction), along with its pattern data. For example, if pattern P2 is 100 pattern lines long, upon the completion of the $100^{th}$ pattern line, the computer would provide the LUT select for pattern P4, along with the first line of its pattern data. It should be clear from this example that the pattern placement possibilities are limitless with this method of embedding control in the data stream.

Once the base firing times are set (as part of the address lines to the base firing time memory) and the LUT is selected (as part of the address of the LUT memory), the pattern data (i.e. the code for that pixel) can be routed in the normal path. It first is used as the remaining part of the address of the LUT. The contents at that address (i.e. the percent of base firing time assigned to each specific applicator on a given color bar) are used as the remaining part of the address of the base firing time memory. The other part of the address of the base firing time memory is the base firing time outputted earlier. The output of the base firing time memory is the actual firing time (measured in units of, e.g., 0.1 or 0.2 milliseconds) to be used by that applicator on that color bar to dispense its colorant on a specific pixel area on the substrate. If desired, that firing time then can be translated through the tuning memory (i.e. the firing time is part of the address of the tuning memory and the jet number is the remainder of the address) to an altered firing time. The firing time then goes into the stagger memory which stores it until the substrate arrives under that color bar, thereby providing compensation for color bar spacing (and for valve card stagger), based on the high resolution print delays loaded in the control data).

Figure 13:
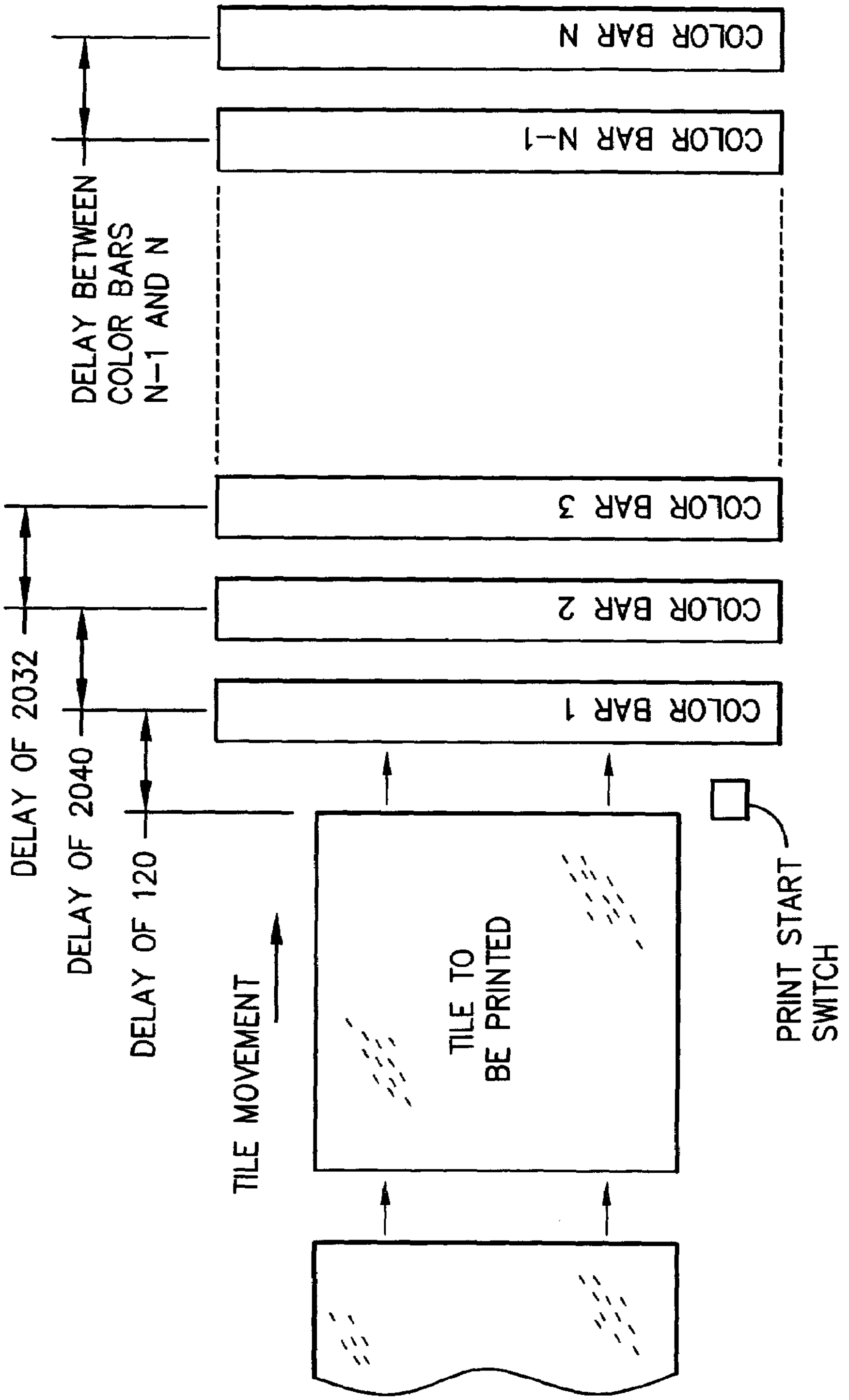
FIG. 13 schematically depicts the overall operation of the electronic registration system, as discussed in detail herein.

FIG. 13 illustrates the electronic registration process used in this control system. In the exemplary machine discussed herein, the preferred design for color bars included fabrication of the color bars in groups of eight bars, making the distance between any of the eight bars within a group fixed (i.e., not mechanically adjustable). In order to compensate for small errors in the overall distance between adjacent color bars, as well as small differences in end-to-end spacing (i.e., non-parallel alignment), an electronic adjustment has been developed. This involves generating a print start delay number for each color bar relative to an initial print start input. This print start input is supplied by a print start sensor that is activated just prior to the tile arriving at Color Bar 1 for printing. The print start delay number represents high resolution increments of $\frac{1}{240}^{th}$ of an inch of tile movement past the print start input switch. This provides a means for adjustment for each color bar on the machine. For example: Color Bar 1 may have a print start delay of 120, meaning that Color Bar 1 will begin printing at $120\times\frac{1}{240}^{th}$ of an inch or 0.5 inches from the point that the print start sensor was closed due to the movement of the leading edge of the substrate (e.g., a carpet tile). When Color Bar 1 starts printing, it outputs a print start signal to Color Bar 2. Color Bar 2 may have a delay of 2040 meaning that Color Bar 2 will begin printing $2040\times\frac{1}{240}^{th}$ of an inch or 8.5 inches (measured along the length of the substrate, as tracked by the rotary encoder) from the point that Color Bar 1 started printing. Note that the distance from print start sensor to first color bar is ignored—only the distance from the immediately upstream color bar is used. As shown in FIG. 13, the distance between Color Bar 2 and Color Bar 3 may be 2032 high resolution pulses. Each subsequent color bar passes its print start signal to the succeeding downstream color bar along the path of the substrate, thereby providing, using high resolution transducer pulse counts, a means to assure that the proper pattern line of the substrate is under the proper color bar at the proper time.

The specific digital and patterning devices and parameters presented throughout this description are exemplary and illustrative only, and are not intended to be limiting in any way. It is contemplated that other, substantially equivalent devices, configurations, arrangements, parameter values, and specific functions may be substituted without departing from the spirit of the teachings herein. Therefore, it is not intended that the scope of the development disclosed herein be limited to specific embodiments illustrated and described.

We claim:

1. An electronic digital control system for printing a pattern onto the surface of a moving substrate in accordance with digitally-defined pattern data using a plurality of individually controllable colorant-dispensing applicators arranged in a series of arrays positioned along the path of said moving substrate, each array containing a colorant representing a separate process color, said digital control system being adapted to convert said pattern data, expressed in terms of a color assignment for each individual pattern element comprising said pattern and containing base firing times for each of said process colors, into a series of logical firing instructions for each of said applicators as required to reproduce said assigned color on said substrate using one or more of said process colors, said digital control system comprising a. a digital computer providing a source of pattern data and multiple data ports from which said computer can output said pattern data, said pattern data comprising said color assignments as well as conversion data for converting said color assignments into said firing instructions;

b. means for measuring movement of said substrate in uniform, discrete increments, said increments individually serving to define fine scale movement of said substrate and thereby serving to define a single control cycle of said control system and, when arranged in groups of a uniform predetermined number, also serving to define the distance along the path of said substrate to which a single pattern line defined by said pattern data is assigned;

c. At least one electronically-defined look-up table comprising a plurality of addressable locations within a memory device, each such location containing data relating to a specific pixel to be patterned on said substrate, said data comprising instructions for reproducing the color assigned to each pixel comprising said pattern, said instructions including the relative percentage of each base firing time to be used to reproduce the assigned color.

2. The control system of claim 1 wherein the number of addressable locations comprising said look-up table within said first memory device is reduced in situations in which the number of assigned colors is reduced.

3. The control system of claim 1 wherein at least two look-up tables are available for use, and said pattern data identifies which look-up table is to be used.

4. The control system of claim 1 wherein said digital computer provides said pattern data on a high speed channel, and provides other, less time-sensitive data on a second channel.

5. The control system of claim 4 wherein said look-up table is loaded using said second channel.

6. The control system of claim 1 wherein said digital computer is capable of providing pattern data in the form of an n-bit word or an n/2-bit word, where n is the maximum word length accommodated by said digital computer, thereby allowing said control system to pattern, with no loss of efficiency, a single full-width substrate or a half-width substrate.

7. The control system of claim 1 wherein said conversion of said pattern data comprises the formation of logical firing instructions, said firing instructions comprising the formation, for each control cycle, of a single bit for each individual colorant applicator positioned within each of said plurality of arrays, said single bit indicating whether said applicator should dispense colorant during that control cycle in accordance with said pattern data.

8. The control system of claim 7, further comprising a. means for converting said single bit into an actuation voltage pulse for each colorant applicator, and for increasing the energy of said voltage pulse at the leading edge of said pulse to accelerate the actuation time of said applicator, and b. means for at least partially dissipating said energy pulse where said energy pulse is to be applied to an applicator that is already actuated.

9. The control system of claim 7 wherein, following such conversion, said firing instructions are written into locations in a memory device using a write pointer, the contents of said locations being transferred to said individual applicators using delays in the reading of such contents that are sufficient to provide compensation for the spacing of said series of arrays along said substrate path, as well as the spacing of the individual applicators within a single array, with respect to the movement of said substrate.

10. The control system of claim 9 wherein a static memory having a first port and a second port is used to provide for the asynchronous writing of pattern data from said first port and reading of pattern data from said second port, following said compensation for the positioning of the individual applicators.

11. The control system of claim 9 wherein said individual applicators positioned within each of said plurality of arrays are arranged in a staggered configuration, and wherein said compensation for said staggered positioning of the individual applicators within each array is achieved by decrementing a line counter, then adding to the counter value an amount sufficient to compensate for the distance between adjacent staggered individual applicators, as measured along the path of the substrate in units of pattern lines.

12. The control system of claim 1 wherein an optional look-up table is available for use, and wherein said optional look-up table is accessed after the at least one electronically-defined look-up table and contains adjustment factors to allow each individual applicator within a given array to have an equivalent delivery volume for each logical firing instruction.

13. The control system of claim 12 wherein a plurality of said individual applicators are arranged on a valve card, and each of said valve cards within a given array is assigned a unique, electronically-readable identifier.

* * * * *